(12) United States Patent
Di et al.

(10) Patent No.: US 12,236,710 B2
(45) Date of Patent: Feb. 25, 2025

(54) FINGERPRINT RECOGNITION METHOD AND ELECTRONIC DEVICE

(71) Applicant: Honor Device Co., Ltd., Shenzhen (CN)

(72) Inventors: Haoxuan Di, Shenzhen (CN); Danhong Li, Shenzhen (CN); Xiaowu Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/245,283

(22) PCT Filed: Sep. 13, 2022

(86) PCT No.: PCT/CN2022/118475
§ 371 (c)(1),
(2) Date: Mar. 14, 2023

(87) PCT Pub. No.: WO2023/065889
PCT Pub. Date: Apr. 27, 2023

(65) Prior Publication Data
US 2024/0304027 A1    Sep. 12, 2024

(30) Foreign Application Priority Data
Oct. 22, 2021   (CN) .......................... 202111236058.2

(51) Int. Cl.
*G06V 40/13* (2022.01)
*G06V 10/80* (2022.01)
*G06V 10/98* (2022.01)
*G06V 40/12* (2022.01)

(52) U.S. Cl.
CPC .......... *G06V 40/1365* (2022.01); *G06V 10/80* (2022.01); *G06V 10/993* (2022.01)

(58) Field of Classification Search
CPC .. G06V 40/1365; G06V 10/993; G06V 10/80; G06V 40/12; G06V 10/30; G06V 10/32
See application file for complete search history.

(56) References Cited

U.S. PATENT DOCUMENTS

| 10,643,055 B2 | 5/2020 | Wang |
| 10,872,255 B2 | 12/2020 | Hwang et al. |
| 2015/0022670 A1 | 1/2015 | Gozzini et al. |
| 2015/0071502 A1 | 3/2015 | Breznicky |
| (Continued) |

FOREIGN PATENT DOCUMENTS

| CN | 106778457 A | 5/2017 |
| CN | 108446651 A | 8/2018 |
| (Continued) |

*Primary Examiner* — Stephen G Sherman
(74) *Attorney, Agent, or Firm* — Slater Matsil, LLP

(57) ABSTRACT

This application relates to the field of fingerprint recognition, and discloses a fingerprint recognition method and an electronic device. An electronic device obtains a fingerprint image of a user by using a fingerprint recognition module in response to a fingerprint recognition operation of the user; and performs a quality evaluation on the obtained fingerprint image, and repairs and recognizes the fingerprint image based on a quality evaluation result.

20 Claims, 11 Drawing Sheets

(56) References Cited

U.S. PATENT DOCUMENTS

| | | | |
|---|---|---|---|
| 2016/0180142 A1* | 6/2016 | Riddle | G06V 40/1312 |
| | | | 382/124 |
| 2019/0050659 A1 | 2/2019 | Hwang et al. | |
| 2019/0057270 A1 | 2/2019 | Heo et al. | |
| 2020/0252217 A1* | 8/2020 | Mathieu | H04L 9/0643 |
| 2021/0042496 A1 | 2/2021 | Choe | |

FOREIGN PATENT DOCUMENTS

| | | |
|---|---|---|
| CN | 109388926 A | 2/2019 |
| CN | 111144268 A | 5/2020 |
| CN | 112699863 A | 4/2021 |
| CN | 113298722 A | 8/2021 |
| CN | 113469028 A | 10/2021 |

* cited by examiner

FINGERPRINT RECOGNITION METHOD AND ELECTRONIC DEVICE

CROSS-REFERENCE TO RELATED APPLICATIONS

This application is a national stage of International Application No. PCT/CN2022/118475, filed on Sep. 13, 2022, which claims priority to Chinese Patent Application No. 202111236058.2, filed on Oct. 22, 2021. The disclosures of both of the aforementioned applications are hereby incorporated by reference in their entireties.

TECHNICAL FIELD

This application relates to the field of fingerprint recognition, and in particular, to a fingerprint recognition method and an electronic device.

BACKGROUND

In a process in which a user uses a mobile phone, the mobile phone is usually provided with a lock screen function (that is, locking a screen) to protect user privacy and data security and prevent the user from accidentally touching (a misoperation). The user may perform a lock screen operation (for example, press a lock screen key) on the mobile phone before the user does not use the mobile phone, to avoid another person from snooping the user privacy and stealing data by operating the mobile phone of the user. The user may unlock the mobile phone before using mobile phone.

Usually, an unlock operation of the mobile phone includes manners such as password unlock, fingerprint unlock, and face unlock. Fingerprint unlock is widely used because of high stability and security. In addition, as a screen of the mobile phone develops towards a full screen, currently, fingerprint unlock of the mobile phone usually adopts an under-screen fingerprint solution, to avoid occupying a screen display region by a fingerprint unlock region, and increase a screen-to-body ratio. An implementation of the under-screen fingerprint solution usually includes optical fingerprint recognition and ultrasonic fingerprint recognition. Because of a strong penetration ability, ultrasonic fingerprint recognition can be adapted to a plurality of types of screens without burning a screen. In addition, ultrasonic fingerprint recognition can have a large recognition area, high security, and better user experience. Therefore, ultrasonic fingerprint recognition becomes a development trend of the under-screen fingerprint solution.

However, current imaging quality of ultrasonic fingerprint recognition is poor, which results in a low recognition rate of ultrasonic fingerprint recognition.

SUMMARY

This application provides a fingerprint recognition method and an electronic device, to resolve a problem of a low recognition rate due to poor imaging quality of a fingerprint image during fingerprint recognition.

To achieve the foregoing objective, the following technical solutions are used in the embodiments of this application:

According to a first aspect, an embodiment of this application provides a fingerprint recognition method, and the method may be applied to an electronic device. The method includes: obtaining a first fingerprint image of a user; performing a quality evaluation on the first fingerprint image; determining the first fingerprint image as a first quality level, where the first quality level is used to identify quality of the first fingerprint image; determining a first repair model based on the first quality level, where the first repair model includes a first repair parameter, and the first repair model corresponds to the first quality level; processing the first fingerprint image based on the first repair model to obtain a second fingerprint image; and performing fingerprint recognition by using the second fingerprint image.

By using the foregoing technical solution, repair of a corresponding degree can be performed based on the quality of the fingerprint image collected by a fingerprint recognition module, and then fingerprint recognition is performed. Therefore, a fingerprint recognition rate can be increased by improving the quality of the fingerprint image through repairing the fingerprint image, and recognizing a fake fingerprint due to excessive repair of the fingerprint image can be avoided during fingerprint recognition.

In a possible implementation, the method further includes: obtaining a third fingerprint image of the user; performing a quality evaluation on the third fingerprint image; determining the third fingerprint image as a second quality level, where the second quality level is used to identify quality of the third fingerprint image; determining a second repair model based on the second quality level, where the second repair model includes a second repair parameter, and the second repair model corresponds to the second quality level; processing the third fingerprint image based on the second repair model to obtain a fourth fingerprint image; and performing fingerprint recognition by using the fourth fingerprint image.

That is, when the user performs fingerprint recognition again, if a quality level of a fingerprint image re-collected by the mobile phone is different from the previous one, the mobile phone may determine a corresponding fingerprint repair parameter based on the quality level of the newly collected fingerprint image to repair the fingerprint image. That is, after collecting a fingerprint image each time, the mobile phone can perform a quality evaluation on the fingerprint image, and collect a corresponding repair parameter based on a quality level determined through evaluation to repair the fingerprint image. In this way, recognizing a fake fingerprint due to high-degree repair performed on a high-quality fingerprint image by the mobile phone can be avoided during subsequent fingerprint recognition.

In another possible implementation, the first quality level is higher than the second quality level, and a change degree between the second fingerprint image and the first fingerprint image is less than a change degree between the fourth fingerprint image and the third fingerprint image.

That is, the mobile phone can perform lower-degree repair on a fingerprint image with a higher quality level. In this way, recognizing a fake fingerprint due to high-degree repair performed on a high-quality fingerprint image by the mobile phone can be avoided during subsequent fingerprint recognition.

In another possible implementation, the determining a first repair model based on the first quality level includes: determining the first repair parameter based on the first quality level and a preset mapping relationship between a quality level and a repair parameter; and determining a repair model that includes the first repair parameter as the first repair model; and the determining a second repair model based on the second quality level includes: determining the second repair parameter based on the second quality level and the preset mapping relationship between a quality level and a repair parameter; and determining a repair model that includes the second repair parameter as the second repair model.

In this way, the mobile phone can determine a corresponding repair model or repair parameter based on the preset mapping relationship and the quality level, so that an implementation is simpler.

In another possible implementation, the first repair model is the same as or different from the second repair model.

That is, when the repair models are the same, it indicates that the mobile phone repairs the fingerprint image by using the same repair model, but the repair model has different repair parameters corresponding to different quality levels. When the repair models are different, it indicates that the mobile phone repairs fingerprint images of corresponding quality levels by using different repair models for different quality levels.

In another possible implementation, the first repair model is different from the second repair model; and the determining a first repair model based on the first quality level includes: determining the first repair model based on the first quality level and a preset mapping relationship between a quality level and a repair model; and the determining a second repair model based on the second quality level includes: determining the second repair model based on the second quality level and the preset mapping relationship between a quality level and a repair model.

In this way, the mobile phone can determine a corresponding repair model or repair parameter based on the preset mapping relationship and the quality level, so that an implementation is simpler.

In another possible implementation, the obtaining a first fingerprint image of a user includes: collecting a first raw image of a fingerprint of the user; and preprocessing the first raw image to obtain the first fingerprint image.

In another possible implementation, the preprocessing the first raw image to obtain the first fingerprint image includes: preprocessing the first raw image based on preset calibration data to obtain the first fingerprint image, where the calibration data includes noise data obtained when the raw image is collected.

The fingerprint image is obtained by preprocessing the raw image, which can reduce noise in the fingerprint image and improve quality of the fingerprint image.

In another possible implementation, the performing a quality evaluation on the first fingerprint image includes: fusing the first fingerprint image with the first raw image; and performing the quality evaluation on the first fingerprint image based on a fusion result of the first fingerprint image and the first raw image.

In this way, the quality evaluation is performed on the fingerprint image based on a fused image, so that accuracy of the quality evaluation on the fingerprint image can be improved.

In another possible implementation, before the fusing the first fingerprint image with the first raw image, the method further includes: processing the first raw image based on the calibration data; and the fusing the first fingerprint image with the first raw image includes: fusing a result obtained by processing the first raw image based on the calibration data with the first fingerprint image.

In this way, denoising can be performed on the raw image based on the calibration data before fusion, thereby further improving quality of fused data, and finally improving accuracy of the quality evaluation on the fingerprint image.

According to a second aspect, an embodiment of this application provides a fingerprint recognition apparatus, and the apparatus may be applied to an electronic device to implement the method according to the first aspect. A function of the apparatus may be implemented by hardware or may be implemented by corresponding software executed by hardware. The hardware or the software includes one or more modules corresponding to the function, such as a processing module and a fingerprint recognition module.

The fingerprint recognition module may be configured to obtain a first fingerprint image of a user. The processing module may be configured to: perform a quality evaluation on the first fingerprint image; determine the first fingerprint image as a first quality level, where the first quality level is used to identify quality of the first fingerprint image; determine a first repair model based on the first quality level, where the first repair model includes a first repair parameter, and the first repair model corresponds to the first quality level; and process the first fingerprint image based on the first repair model to obtain a second fingerprint image. The fingerprint recognition module may be further configured to perform fingerprint recognition by using the second fingerprint image.

In a possible implementation, the fingerprint recognition module may be further configured to obtain a third fingerprint image of the user. The processing module may be further configured to: perform a quality evaluation on the third fingerprint image; determine the third fingerprint image as a second quality level, where the second quality level is used to identify quality of the third fingerprint image; determine a second repair model based on the second quality level, where the second repair model includes a second repair parameter, and the second repair model corresponds to the second quality level; and process the third fingerprint image based on the second repair model to obtain a fourth fingerprint image. The fingerprint recognition module may be further configured to perform fingerprint recognition by using the fourth fingerprint image.

In another possible implementation, the first quality level is higher than the second quality level, and a change degree between the second fingerprint image and the first fingerprint image is less than a change degree between the fourth fingerprint image and the third fingerprint image.

In another possible implementation, the processing module is specifically configured to determine the first repair parameter based on the first quality level and a preset mapping relationship between a quality level and a repair parameter; and determine a repair model that includes the first repair parameter as the first repair model. The processing module is specifically configured to determine the second repair parameter based on the second quality level and the preset mapping relationship between a quality level and a repair parameter; and determine a repair model that includes the second repair parameter as the second repair model.

In another possible implementation, the first repair model is the same as or different from the second repair model.

In another possible implementation, the first repair model is different from the second repair model; the processing module is specifically configured to determine the first repair model based on the first quality level and a preset mapping relationship between a quality level and a repair model; and the processing module is specifically configured to determine the second repair model based on the second quality level and the preset mapping relationship between a quality level and a repair model.

In another possible implementation, the fingerprint recognition module is specifically configured to: collect a first raw image of a fingerprint of the user; and preprocess the first raw image to obtain the first fingerprint image.

In another possible implementation, the fingerprint recognition module is specifically configured to preprocess the first raw image based on preset calibration data to obtain the first fingerprint image, where the calibration data includes noise data obtained when the raw image is collected.

In another possible implementation, the processing module is specifically configured to: fuse the first fingerprint image with the first raw image; and perform the quality evaluation on the first fingerprint image based on a fusion result of the first fingerprint image and the first raw image.

In another possible implementation, the processing module is further configured to process the first raw image based on the calibration data; and the processing module is specifically configured to fuse a result obtained by processing the first raw image based on the calibration data with the first fingerprint image.

According to a third aspect, an embodiment of this application provides an electronic device, including a processor and a memory for storing instructions executable by the processor. When the processor is configured to execute the instructions, the electronic device is enabled to implement the fingerprint recognition method according to any one of the first aspect or the possible implementations of the first aspect.

According to a fourth aspect, an embodiment of this application provides a computer-readable storage medium, where the computer-readable storage medium stores a computer program instructions. When the computer program instructions are executed by the electronic device, the electronic device is enabled to implement the fingerprint recognition method according to any one of the first aspect or the possible implementations of the first aspect.

According to a fifth aspect, an embodiment of this application provides a computer program product, including computer-readable code. When the computer-readable code is run on an electronic device, the electronic device is enabled to implement the fingerprint recognition method according to any one of the first aspect or the possible implementations of the first aspect.

It should be understood that for beneficial effects of the second aspect to the fifth aspect, reference may be made to related descriptions in the first aspect. Details are not described herein again.

According to a sixth aspect, an embodiment of this application provides a fingerprint recognition method, and the method may be applied to an electronic device. The method includes: obtaining a first fingerprint image of a user; performing a quality evaluation on the first fingerprint image; determining the first fingerprint image as a first quality level, where the first quality level is used to identify quality of the first fingerprint image; determining whether the first quality level is a preset quality level; if yes, determining a first repair model based on the first quality level, where the first repair model includes a first repair parameter, and the first repair model corresponds to the first quality level; processing the first fingerprint image based on the first repair model to obtain a second fingerprint image; and performing fingerprint recognition by using the second fingerprint image.

By using the foregoing technical solution, repair of a corresponding degree can be performed based on the quality of the fingerprint image collected by a fingerprint recognition module, and then fingerprint recognition is performed. Therefore, a fingerprint recognition rate can be increased by improving the quality of the fingerprint image through repairing the fingerprint image, and recognizing a fake fingerprint due to excessive repair of the fingerprint image can be avoided during fingerprint recognition.

In a possible implementation, after the determining whether the first quality level is a preset quality level, the method further includes: if no, performing fingerprint recognition on the first fingerprint image.

In this way, when the fingerprint image does not match the preset quality level, fingerprint recognition can be directly performed on the fingerprint image, so that only an image requiring fingerprint repair can be repaired, thereby improving fingerprint recognition efficiency.

In another possible implementation, the preset quality level includes one or more quality levels.

In another possible implementation, the obtaining a first fingerprint image of a user includes: collecting a first raw image of a fingerprint of the user; and preprocessing the first raw image to obtain the first fingerprint image.

The fingerprint image is obtained by preprocessing the raw image, which can reduce noise in the fingerprint image and improve quality of the fingerprint image.

According to a seventh aspect, an embodiment of this application provides a fingerprint recognition apparatus, and the apparatus may be applied to an electronic device to implement the method according to the sixth aspect. A function of the apparatus may be implemented by hardware or may be implemented by corresponding software executed by hardware. The hardware or the software includes one or more modules corresponding to the function, such as a processing module and a fingerprint recognition module.

The fingerprint recognition module may be configured to obtain a first fingerprint image of a user. The processing module may be configured to: perform a quality evaluation on the first fingerprint image; determine the first fingerprint image as a first quality level, where the first quality level is used to identify quality of the first fingerprint image; judge whether the first quality level is a preset quality level; if yes, determine a first repair model based on the first quality level, where the first repair model includes a first repair parameter, and the first repair model corresponds to the first quality level; and process the first fingerprint image based on the first repair model to obtain a second fingerprint image. The fingerprint recognition module may be further configured to perform fingerprint recognition by using the second fingerprint image.

In a possible implementation, the fingerprint recognition module may be further configured to: if no, perform fingerprint recognition on the first fingerprint image.

In another possible implementation, the preset quality level includes one or more quality levels.

In another possible implementation, the fingerprint recognition module is specifically configured to: collect a first raw image of a fingerprint of the user; and preprocess the first raw image to obtain the first fingerprint image.

According to an eighth aspect, an embodiment of this application provides an electronic device, including a processor and a memory for storing instructions executable by the processor. When the processor is configured to execute the instructions, the electronic device is enabled to implement the fingerprint recognition method according to any one of the sixth aspect or the possible implementations of the sixth aspect.

According to a ninth aspect, an embodiment of this application provides a computer-readable storage medium, where the computer-readable storage medium stores computer program instructions. When the computer program instructions are executed by the electronic device, the electronic device is enabled to implement the fingerprint recognition method according to any one of the sixth aspect or the possible implementations of the sixth aspect.

According to a tenth aspect, an embodiment of this application provides a computer program product, including computer-readable code. When the computer-readable code is run on an electronic device, the electronic device is enabled to implement the fingerprint recognition method according to any one of the sixth aspect or the possible implementations of the sixth aspect.

It should be understood that for beneficial effects of the seventh aspect to the tenth aspect, reference may be made to related descriptions in the sixth aspect. Details are not described herein again.

DETAILED DESCRIPTION OF ILLUSTRATIVE EMBODIMENTS

To protect user privacy and data security and prevent a user from misoperating a mobile phone when the user does not use the mobile phone, the mobile phone is usually provided with a lock screen function. That is, the user may perform a lock screen operation (for example, press a lock screen key) on the mobile phone before the user does not use the mobile phone, to avoid another person from snooping the user privacy or stealing user data by operating the mobile phone of the user. When the user needs to use the mobile phone again, the user may unlock the mobile phone before using the mobile phone.

Usually, an unlock operation of the mobile phone includes manners such as password unlock, fingerprint unlock, and face unlock. Fingerprint unlock is widely used because of high stability and security. As a screen of the mobile phone develops towards a full screen, currently, fingerprint unlock of the mobile phone usually adopts an under-screen fingerprint solution.

Figure 1:
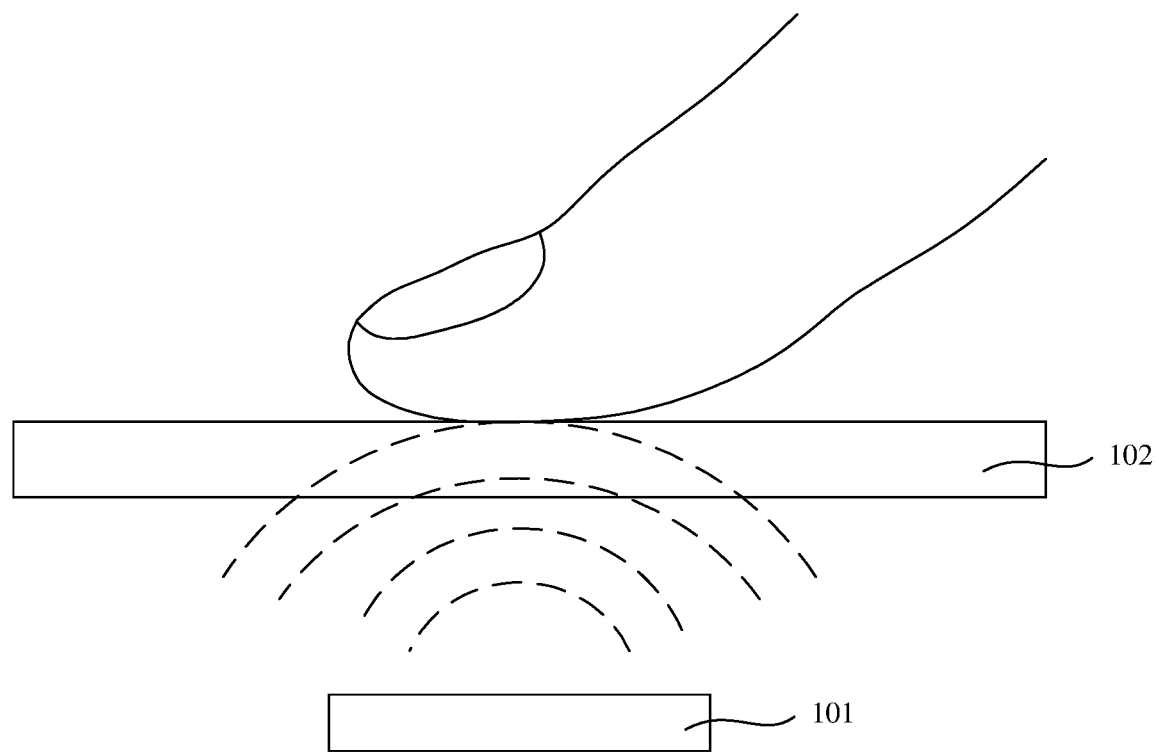
FIG. 1 is a schematic diagram of a principle of an ultrasonic fingerprint recognition module according to an embodiment of this application.

An implementation of the under-screen fingerprint solution usually includes optical fingerprint recognition and ultrasonic fingerprint recognition. Light reflection is adopted in optical fingerprint recognition to obtain a fingerprint image. That is, light emitted by a light source (for example, an OLED on an organic light-emitting diode (organic light-emitting diode, OLED) screen is used as the light source) illuminates a finger region, and the illuminated finger region may reflect the light back to a sensor, so that the sensor obtains the fingerprint image based on the reflected light. Ultrasonic reflection is adopted in ultrasonic fingerprint recognition to obtain a fingerprint image. For example, as shown in FIG. 1, an ultrasonic fingerprint recognition module includes at least a transducer 101. An ultrasonic wave sent by the transducer 101 can scan a finger region through a screen 102. The scanned finger region can reflect the ultrasonic wave back to the transducer 101. In addition, the reflected ultrasonic wave can cause the transducer 101 to generate vibration and convert the vibration into an electrical signal, so that the fingerprint image can be obtained based on the converted electrical signal. Because the ultrasonic wave has a stronger penetration ability than the light, the ultrasonic fingerprint recognition can be adapted to a plurality of types of screens due to the strong penetration ability. In addition, the fingerprint image collected based on ultrasonic fingerprint recognition is a three-dimensional image. Therefore, ultrasonic fingerprint recognition has high security, so that ultrasonic fingerprint recognition becomes a development trend of the under-screen fingerprint solution. However, current imaging quality of ultrasonic fingerprint recognition is poor, which results in a low recognition rate of ultrasonic fingerprint recognition.

Figure 2:
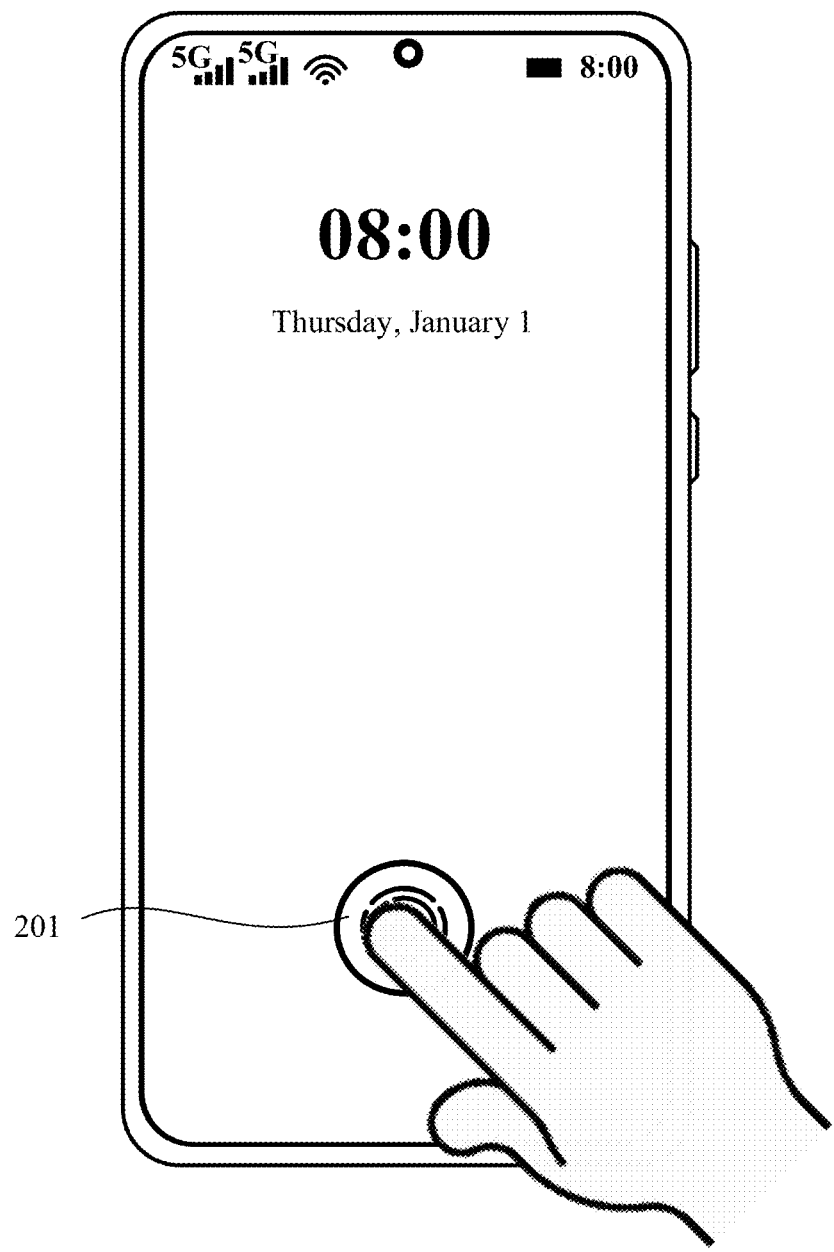
FIG. 2 is a schematic diagram of an application scenario of a fingerprint recognition method according to an embodiment of this application.

To resolve the foregoing problem, an embodiment of this application provides a fingerprint recognition method. The method may be applied to a scenario in which a user performs fingerprint unlock on an electronic device with fingerprint recognition (namely, an electronic device including a fingerprint recognition module). For example, the electronic device is a mobile phone, and the mobile phone is provided with under-screen fingerprint recognition. As shown in FIG. 2, when the mobile phone is in a lock screen state, a region corresponding to a fingerprint recognition module on a screen of the mobile phone may display an indication picture 201 used to indicate a fingerprint unlock region. The user may use a finger that is used for fingerprint unlocking to perform a touch operation (or a press operation) at a location corresponding to the indication picture 201. In response to the touch operation performed by the user at the location corresponding to the indication picture 201, the mobile phone may obtain a fingerprint image of the corresponding finger of the user by using the fingerprint recognition module, and perform fingerprint recognition based on the obtained fingerprint image according to the fingerprint recognition method provided in this embodiment. This helps unlock the mobile phone when fingerprint recognition succeeds.

The fingerprint recognition method may be: The electronic device obtains the fingerprint image of the user by using the fingerprint recognition module in response to a fingerprint recognition operation of the user; and performs a quality evaluation on the obtained fingerprint image, and repairs and recognizes the fingerprint image based on a quality evaluation result.

The fingerprint image usually refers to a preprocessed image (that is, an image used for fingerprint recognition) of a fingerprint obtained by preprocessing image information after the image information of the fingerprint is obtained. Usually, the image information of the fingerprint collected by the fingerprint recognition module includes a raw image of the fingerprint (or referred to as a raw image and raw data, namely, an image of the fingerprint originally collected by the fingerprint recognition module). The fingerprint recognition module is usually further pre-configured with calibration data (or referred to as base data, namely, the calibration data generated when the fingerprint recognition module is produced and calibrated, which mainly includes noise data that exists during fingerprint recognition) and the like. In this case, the preprocessed image of the fingerprint may be obtained based on the raw image and the calibration data. For example, the calibration data may be removed based on the raw image of the fingerprint collected by the fingerprint recognition module (namely, denoising, for example, a value corresponding to a corresponding pixel in the calibration data is respectively subtracted from a value of each pixel in the raw image), to obtain the preprocessed image (namely, the fingerprint image). Certainly, in some possible implementations, after denoising is performed on the raw image of the fingerprint based on the calibration data, preprocessing operations such as Gaussian filtering and removing moire are further performed to obtain the preprocessed image (namely, the fingerprint image).

Optionally, the quality evaluation is to evaluate quality of the fingerprint image to determine a quality level of the fingerprint image. The quality evaluation of the fingerprint image may be performed based on whether a texture is continuous, whether there is a discontinuity point in the texture, whether the image is clear, whether there is noise, white noise, Gaussian noise, or the like in the image, and/or whether there is a foreign object in the image. One or more items may be selected for evaluation, which is not limited in this application. When the quality evaluation is performed on obtained fingerprint images, the fingerprint images may be classified into different quality levels based on quality. The quality of the fingerprint image may refer to a similarity between a fingerprint texture in the fingerprint image and a fingerprint texture of the user. That is, a higher similarity between the fingerprint texture in the fingerprint image and the fingerprint texture of the user indicates that the fingerprint image has higher quality.

Optionally, the quality level may be used to identify the quality of the fingerprint image. Repairing and recognizing the fingerprint image based on a quality evaluation result may be performing repair of a corresponding degree on the fingerprint image based on a quality level corresponding to the quality evaluation result. That is, a higher quality level corresponds to a lower repair degree (a repair degree is usually a change degree of the image before and after the fingerprint image is repaired) (that is, a lower degree of repair is performed on the fingerprint image with the higher quality level). For example, the fingerprint images may be classified into three quality levels based on the quality: low quality, medium quality, and high quality. When the quality evaluation result is the low quality, the fingerprint image is repaired based on a high degree of repair (for example, a high repair degree) corresponding to a low quality image. When the quality evaluation result is the medium quality, the fingerprint image is repaired based on a medium degree of repair (for example, a medium repair degree) corresponding to a medium quality image. When the quality evaluation result is the high quality, the fingerprint image is repaired based on a low degree of repair (for example, a low repair degree) corresponding to a high quality image. Certainly, the quality of the fingerprint images may alternatively be classified into other different quality levels, for example, two levels: low quality and high quality. Correspondingly, a repair degree corresponding to each quality level is correspondingly adjusted, which is not limited herein. After corresponding repair is performed on the fingerprint image, fingerprint recognition may be performed on a repaired fingerprint image.

For example, repairing and recognizing the fingerprint image based on a quality evaluation result may alternatively be performing repair of a corresponding degree on the fingerprint image when a quality level corresponding to the quality evaluation result is consistent with a repairable quality level (or when the quality level corresponding to the quality evaluation result is a preset quality level). For example, fingerprint images may be classified into two quality levels based on quality: low quality and high quality; and the repairable quality level (or the preset quality level) is set to the high quality. When the quality evaluation result is the low quality, fingerprint recognition is directly performed based on the fingerprint image without repairing the fingerprint image. When the quality evaluation result is the high quality, the fingerprint image is repaired based on a repair degree (for example, a low repair degree) corresponding to a high quality image, and then fingerprint recognition is performed based on a repaired fingerprint image. Certainly, the quality of the fingerprint images may alternatively be classified into other different quality levels, for example, three levels: low quality, medium quality, and high quality. Correspondingly, the preset quality level may be set to one or two (that is, a maximum quantity of preset quality levels is N−1, and N is a total quantity of divided quality levels). When an evaluated quality level of a fingerprint image is consistent with the preset quality level, repair of a corresponding degree is performed on the fingerprint image. If an evaluated quality level of a fingerprint image is inconsistent with the preset quality level (that is, the quality level is not the preset quality level), the fingerprint image is not repaired, and fingerprint recognition is directly performed. In this way, it can avoid excessive repair during repair of the fingerprint image whose quality is inconsistent with preset quality, thereby eliminating a risk of recognizing a fake fingerprint during fingerprint recognition due to excessive repair of the fingerprint image.

Figure 3A:
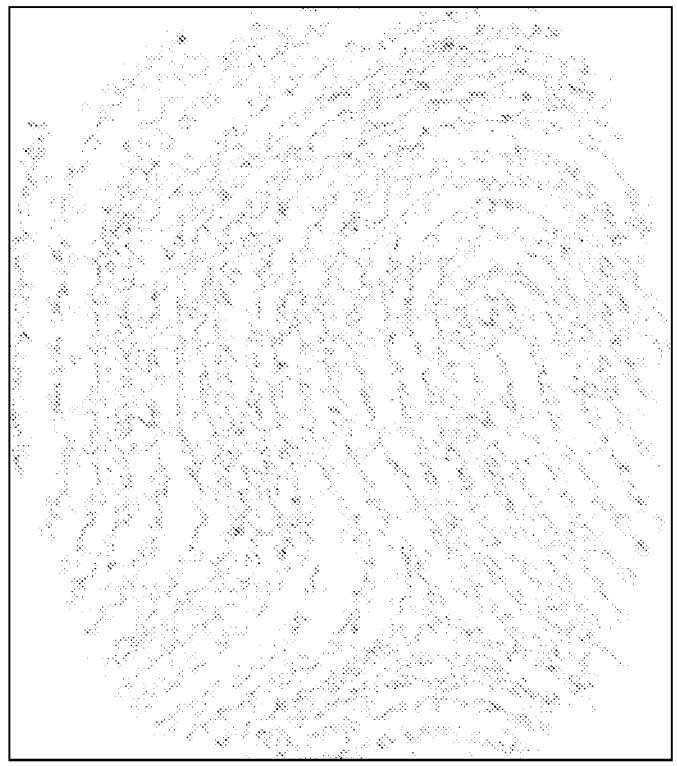
FIG. 3A is a schematic diagram of a low-quality fingerprint image according to an embodiment of this application.
Figure 3B:
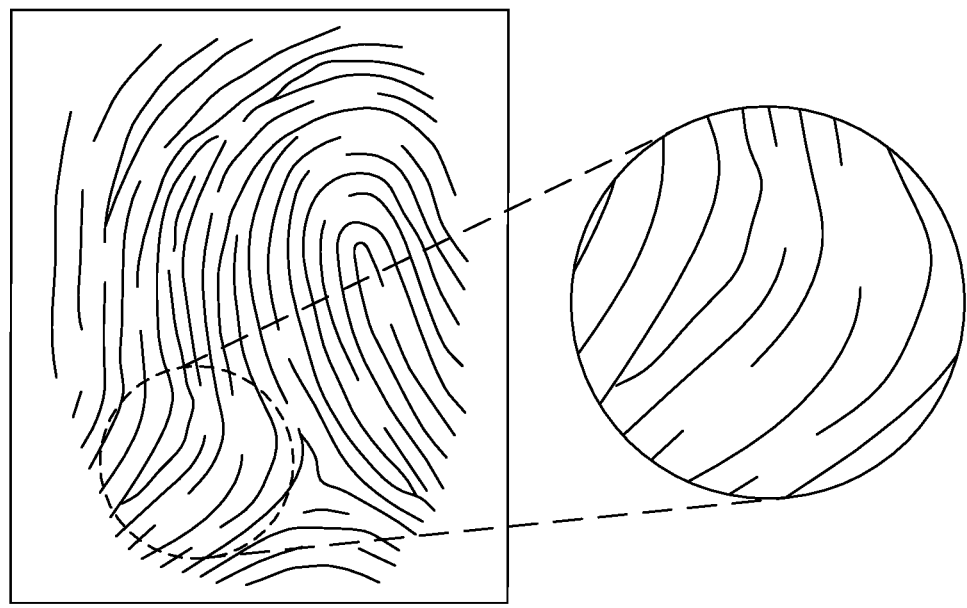
FIG. 3B is a schematic diagram of a medium-quality fingerprint image according to an embodiment of this application.
Figure 3C:
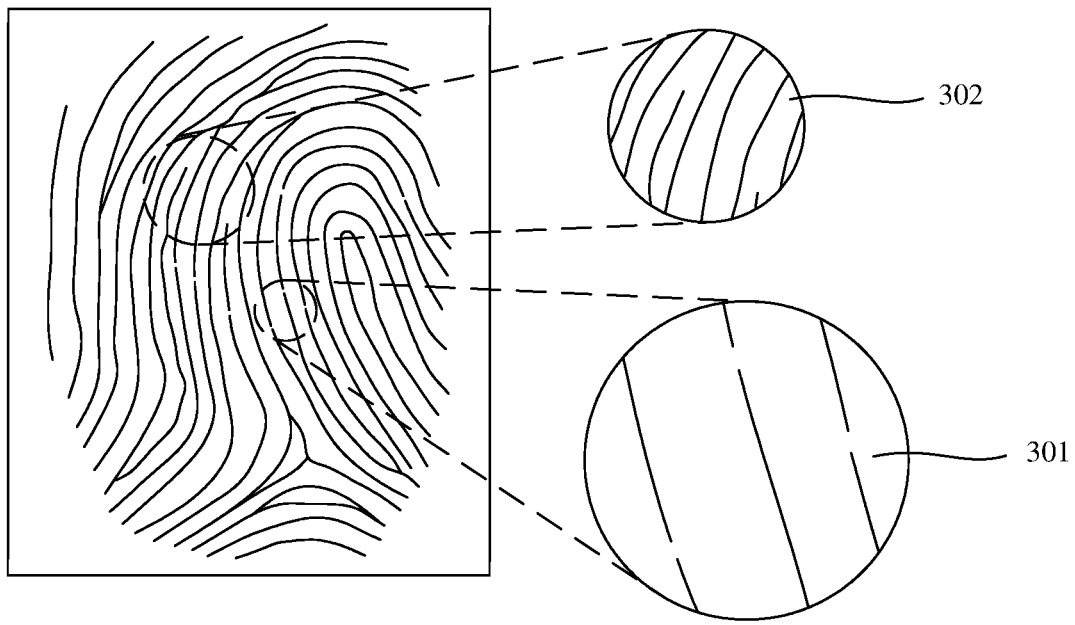
FIG. 3C is a schematic diagram of a high-quality fingerprint image according to an embodiment of this application.
Figure 3D:
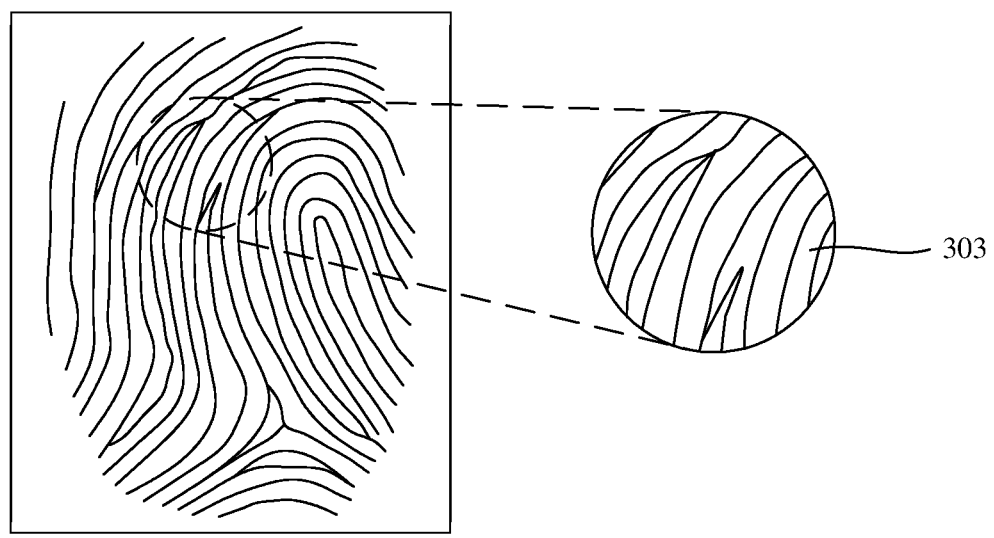
FIG. 3D is a schematic diagram of a high-quality fingerprint image after being excessively repaired according to an embodiment of this application.

According to the fingerprint recognition method, repair of a corresponding degree can be performed based on quality of an obtained fingerprint image, and then fingerprint recognition is performed. Therefore, a fingerprint recognition rate can be increased by improving the quality of the fingerprint image through repairing the fingerprint image, and recognizing a fake fingerprint due to excessive repair of the fingerprint image can be avoided during fingerprint recognition. For example, in an ultrasonic fingerprint recognition process, quality of obtained fingerprint images may be classified into three quality levels: low quality (which, for example, may be referred to as a third quality level in this application), medium quality (which, for example, may be referred to as a second quality level in this application), and high quality (which, for example, may be referred to as a first quality level in this application). Optionally, the fingerprint image may be collected by using an ultrasonic recognition module. As shown in FIG. 3A, a low-quality fingerprint image is an image whose fingerprint texture is unclear and can hardly be distinguished. A percentage of obtaining the low-quality fingerprint image is usually about 10%. As shown in FIG. 3B, a medium-quality fingerprint image is an image whose fingerprint texture is clear but includes a large quantity of obviously discontinuity points (which is usually referred to as a fingerprint image of a dry finger). A percentage of obtaining the medium-quality fingerprint image in ultrasonic fingerprint recognition is usually about 40%. As shown in FIG. 3C, a high-quality fingerprint image is an image whose fingerprint texture is clear and includes a small quantity of slight discontinuity points (for example, a region indicated by 301 in FIG. 3C). A percentage of obtaining the high-quality fingerprint image is usually about 50%. Therefore, according to the method, a quality evaluation can be performed on the obtained fingerprint image, and repair of a corresponding degree (for example, high-degree (which, for example, may be referred to as a third repair degree in this application) repair is performed on the low-quality fingerprint image, medium-degree (which, for example, may be referred to as a second repair degree in this application) repair is performed on the medium-quality fingerprint image, and low-degree (which, for example, may be referred to as a first repair degree in this application) repair is performed on the high-quality fingerprint image) can be respectively performed on fingerprint images of different evaluated quality, to improve overall quality of the obtained fingerprint images, thereby increasing a recognition rate of ultrasonic fingerprint recognition. Repair of different corresponding degrees is respectively performed on the fingerprint images of three different quality levels, to avoid a risk of recognizing a fake fingerprint due to excessive repair of the obtained fingerprint image. For example, the high-quality fingerprint image is still poorer in quality than fingerprint images collected by an optical fingerprint recognition module and a capacitive fingerprint recognition module. Therefore, the high-quality fingerprint image needs to be further repaired. When the high-quality fingerprint image is repaired, if same-degree repair as that on the medium-quality fingerprint image is performed, excessive repair on the high-quality fingerprint image is caused. As a result, in comparison with the high-quality fingerprint image shown in FIG. 3C (namely, the high-quality fingerprint image before repair), in an image shown in FIG. 3D that is obtained after the high-quality fingerprint image is repaired, fingerprint textures that are originally unconnected are connected together due to excessive repair (for example, for parts in a region 302 in FIG. 3C that are originally unconnected, the originally unconnected parts are connected together in a region 303 in FIG. 3D due to excessive repair). Consequently, the high-quality fingerprint image is distorted after being repaired, which leads to a risk of recognizing a fake fingerprint during fingerprint recognition. According to the fingerprint recognition method, the high-quality fingerprint image can be repaired based on a lower repair degree than the medium-quality fingerprint image, thereby avoiding a risk of recognizing a fake fingerprint caused by excessive repair of the high-quality fingerprint image.

The following describes fingerprint recognition methods provided in embodiments of this application with reference to the accompanying drawings.

In this embodiment of this application, an electronic device that has a photographing function may be a mobile phone, a tablet computer, a handheld computer, a PC, a cellular phone, a personal digital assistant (personal digital assistant, PDA), a wearable device (for example, a smartwatch or a smart band), a smart home device (for example, a television), a vehicle-mounted machine (for example, a vehicle-mounted computer), a smart screen, a game console, an augmented reality (augmented reality, AR)/virtual reality (virtual reality, VR) device, or the like. A specific device form of the electronic device is not specially limited in this embodiment of this application.

Figure 4:
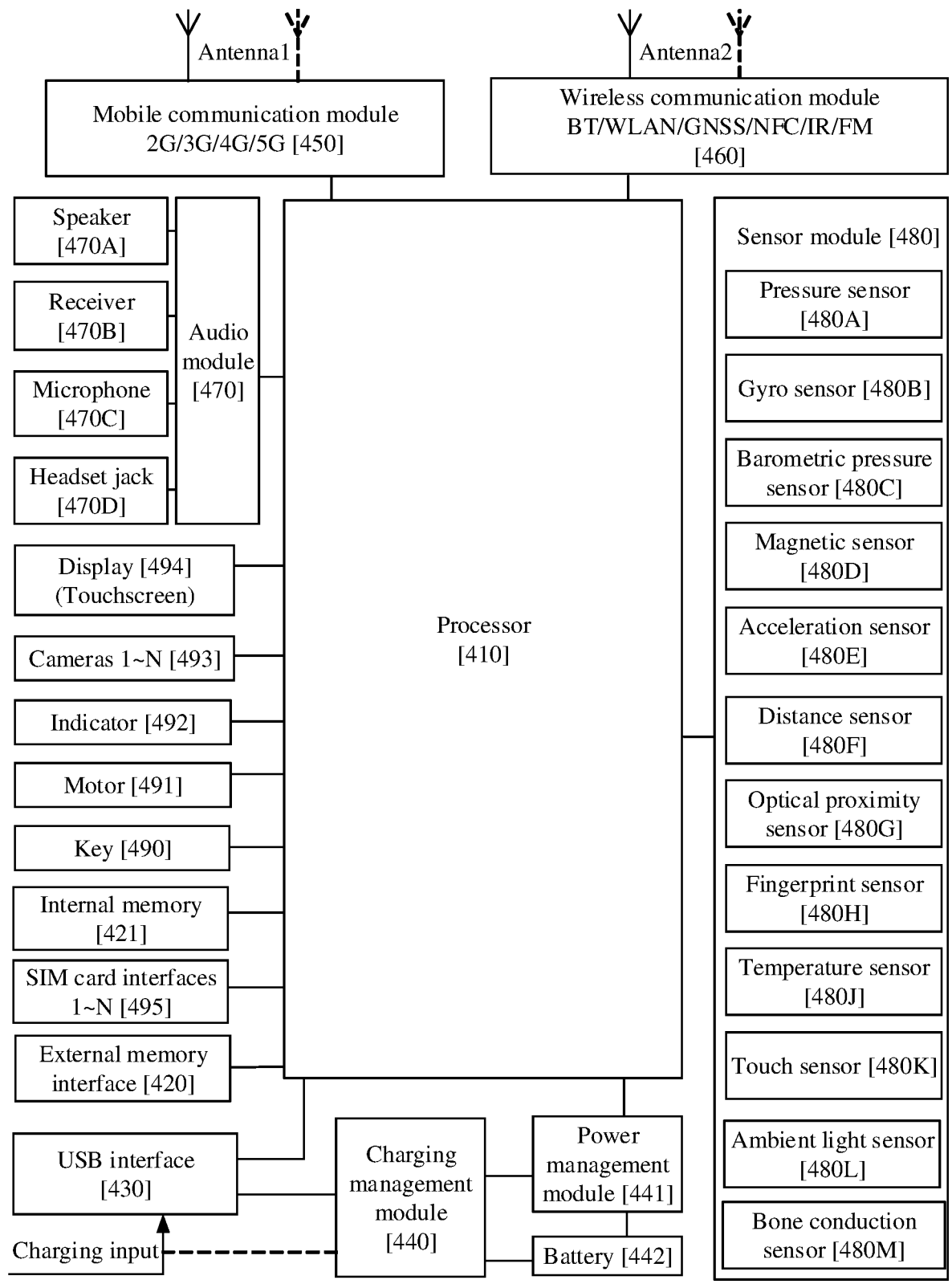
FIG. 4 is a schematic diagram of a structure of an electronic device according to an embodiment of this application.

For example, the electronic device is the mobile phone. FIG. 4 is a schematic diagram of a structure of an electronic device according to an embodiment of this application. That is, for example, the electronic device shown in FIG. 4 may be the mobile phone.

As shown in FIG. 4, the electronic device may include a processor 410, an external memory interface 420, an internal memory 421, a universal serial bus (universal serial bus, USB) interface 430, a charging management module 440, a power management module 441, a battery 442, an antenna 1, an antenna 2, a mobile communication module 450, a wireless communication module 460, an audio module 470, a speaker 470A, a receiver 470B, a microphone 470C, a headset jack 470D, a sensor module 480, a key 490, a motor 491, an indicator 492, a camera 493, a display 494, a subscriber identity module (subscriber identification module, SIM) card interface 495, and the like. The sensor module 480 may include a pressure sensor 480A, a gyro sensor 480B, a barometric pressure sensor 480C, a magnetic sensor 480D, an acceleration sensor 480E, a distance sensor 480F, an optical proximity sensor 480G, a fingerprint sensor 480H (for example, an ultrasonic fingerprint recognition module, an optical fingerprint recognition module, and a capacitive fingerprint recognition module), a temperature sensor 480J, a touch sensor 480K, an ambient light sensor 480L, and a bone conduction sensor 480M.

It can be understood that the structure shown in this embodiment does not constitute a specific limitation on the electronic device. In some other embodiments, the electronic device may include more or fewer components than those illustrated, or combine some components, or split some components, or have different component arrangements. The illustrated components may be implemented by using hardware, software or a combination of software and hardware.

The processor 410 may include one or more processing units. For example, the processor 410 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a never center and a command center of the electronic device. The controller can generate an operation control signal based on instruction operation codes and a timing signal, and complete the control of fetching and executing instructions.

The processor 410 may be further provided with a memory for storing instructions and data. In some embodiments, the memory in the processor 410 is a cache memory. The memory may store instructions or data just used or cyclically used by the processor 410. If the processor 410 needs to use the instructions or the data again, the instructions or the data may be directly invoked from the memory.

Repeated access is avoided, and a waiting time of the processor 410 is reduced, thereby improving system efficiency.

In some embodiments, the processor 410 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, and/or a universal serial bus (universal serial bus, USB) interface, and the like.

A wireless communication function of the electronic device may be implemented by using the antenna 1, the antenna 2, the mobile communication module 450, the wireless communication module 460, the modem processor, the baseband processor, and the like.

The electronic device implements a display function by using the GPU, the display 494, the application processor, and the like. The GPU is a microprocessor for image processing, and connects the display 494 to the application processor. The GPU is configured to perform mathematical and geometric calculations to render graphics. The processor 410 may include one or more GPUs that execute program instructions to generate or change display information.

The display 494 is configured to display an image, a video, and the like. The display 494 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini LED, a micro LED, a micro-OLED, a quantum dot light emitting diodes (quantum dot light emitting diodes, QLED), or the like. In some embodiments, the electronic device may include one or N displays 494, where N is a positive integer greater than 1.

The electronic device can implement a photographing function by using the ISP, the camera 493, the video codec, the GPU, the display 494, the application processor, and the like. In some embodiments, the electronic device may include one or N cameras 493, where N is a positive integer greater than 1. For example, the electronic device may include three cameras: a main camera, a long-focus camera, and an ultra-wide angle camera.

The internal memory 421 may be configured to store computer executable program code, where the executable program code includes instructions. The processor 410 executes various functional applications and data processing of the electronic device by running the instructions stored in the internal memory 421. The internal memory 421 may include a program storage region and a data storage region. The program storage area may store an operating system, an application required for at least one function (such as a sound playing function and an image playing function), and the like. The data storage region can store data (for example, audio data or a phone book) created during use of the electronic device. In addition, the internal memory 421 may include a high-speed random access memory, and may further include a non-volatile memory, for example, at least one magnetic disk storage device, a flash memory device, or a universal flash storage (universal flash storage, UFS).

Certainly, it may be understood that FIG. 4 shows merely an example description when a form of the electronic device is a mobile phone. If the electronic device is a tablet computer, a handheld computer, a PC, a PDA, a wearable device (for example, a smartwatch or a smart band), a smart home device (for example, a television), a vehicle-mounted machine (for example, a vehicle-mounted computer), a smart screen, a game console, an AR/VR device, or in another device form, the electronic device may include fewer structures than those shown in FIG. 4, or may include more structures than those shown in FIG. 4, which is not limited herein.

Methods in the following embodiments may be implemented in the electronic device having the foregoing hardware structure.

Figure 5:
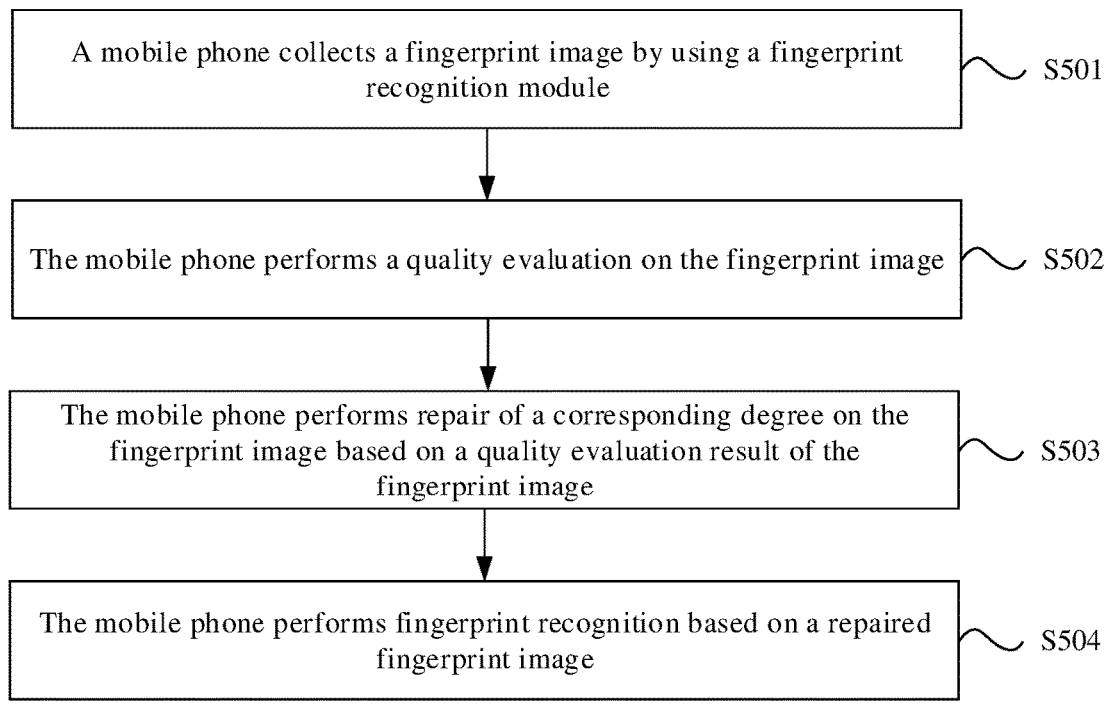
FIG. 5 is a schematic flowchart of a fingerprint recognition method according to an embodiment of this application.

Using that the electronic device is a mobile phone, and fingerprint images obtained by a fingerprint recognition module (or referred to as the fingerprint sensor) of the electronic device may be classified into three quality levels of low quality shown in FIG. 3A, medium quality shown in FIG. 3B, and high quality shown in FIG. 3C as an example, FIG. 5 shows a fingerprint recognition method according to an embodiment of this application. As shown in FIG. 5, the method may include S501 to S504.

S501: The mobile phone obtains fingerprint images (such as a first fingerprint image and a third fingerprint image in this application) by using the fingerprint recognition module.

For example, the fingerprint recognition module may be an ultrasonic fingerprint recognition module, an optical fingerprint recognition module, or a capacitive fingerprint recognition module. The optical fingerprint recognition module and the ultrasonic fingerprint recognition module may be further disposed under a screen (that is, a display) of the mobile phone by using an under-screen fingerprint technology.

The fingerprint image is an image used for fingerprint recognition. For example, information collected by the fingerprint recognition module usually includes a raw image of a fingerprint (for example, a first raw image in this application, where the raw image may also be referred to as a raw image and raw data, that is, an image of the fingerprint originally collected by the fingerprint recognition module). In addition, the fingerprint recognition module (or the mobile phone) usually may be further pre-configured with calibration data (or referred to as base data, namely, the calibration data generated when the fingerprint recognition module is produced and calibrated, which mainly includes noise data that exists when the raw image is collected during fingerprint recognition). Therefore, the fingerprint image collected by the fingerprint recognition module may be obtained based on the raw image (namely, the raw image) and the calibration data (namely, the base data), that is, the fingerprint image may be a preprocessed image obtained by preprocessing the raw image based on the calibration data. For example, the calibration data may be removed based on the raw image of the fingerprint collected by the fingerprint recognition module (namely, denoising, for example, a value corresponding to a corresponding pixel in the calibration data is respectively subtracted from a value of each pixel in the raw image), to obtain the preprocessed image (that is, the preprocessed image is used as the fingerprint image). Certainly, in some possible implementations, after denoising is performed on the raw image of the fingerprint based on the calibration data, preprocessing operations such as Gaussian filtering and moire removal are further performed to obtain the preprocessed image (namely, the fingerprint image), which is not limited herein.

S502: The mobile phone performs a quality evaluation on the fingerprint image.

As an example, the mobile phone may perform a quality evaluation on the fingerprint image by using a fingerprint quality evaluation model. The fingerprint quality evaluation model may be trained based on a Resnet network structure by using a regression idea. That is, the fingerprint quality evaluation model may be used to output a quality evaluation result (for example, a quality score and a quality level) corresponding to the fingerprint image when data including the fingerprint image is input. In this embodiment of this application, the model may be trained based on specific data settings of an input and an output of the model.

For example, the fingerprint quality evaluation model may be trained by using fused fingerprint data as a model input and by using a quality score corresponding to the input fused fingerprint data as a model output.

For example, the fused fingerprint data may be data obtained by performing multimodal data fusion (for example, multimodal data fusion is performed by using a phase-based fusion algorithm, a feature-based fusion algorithm, and a semantic-based fusion algorithm) on the raw image (namely, the raw image) of the fingerprint collected by the fingerprint recognition module and the preprocessed image (namely, the fingerprint image) obtained by performing preprocessing on the raw image. The quality score corresponding to the fused fingerprint data may be a quality score of a preprocessed image in the fused fingerprint data. Data obtained by fusing the raw image and the preprocessed image may be used as the model input, and the quality score corresponding to the preprocessed image is used as the model output to train the fingerprint quality evaluation model. It may be understood that multimodal data fusion may be performed by using a fusion algorithm in the conventional technology, for example, fusion of CONCAT and interpolation, which is not limited in this application.

Figure 6:
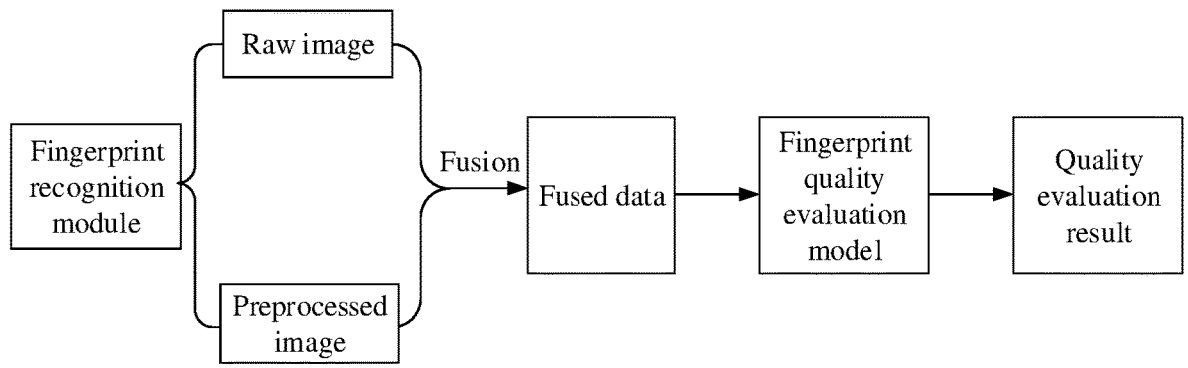
FIG. 6 is a schematic flowchart of a fingerprint quality evaluation according to an embodiment of this application.

As shown in FIG. 6, when the fingerprint quality evaluation model trained based on the foregoing example is used, that the mobile phone performs a quality evaluation on the fingerprint image may be: When the fingerprint recognition module collects the raw image (for example, the first raw image) of the fingerprint and obtains the preprocessed image (namely, the fingerprint image, for example, the first fingerprint image) based on the raw image, the mobile phone may fuse the raw image with the preprocessed image to obtain fused data (namely, fused fingerprint data). Then, the mobile phone may input the fused data into the fingerprint quality evaluation model, so that the fingerprint quality evaluation model outputs a corresponding quality evaluation result (namely, the quality score). Quality levels of different fingerprint images may correspond to different quality score intervals. For example, quality scores may be set to 0-100, an interval corresponding to the quality level of the low quality may be set to [0, 20), an interval corresponding to the quality level of the medium quality may be set to (20, 40), and an interval corresponding to the quality level of the high quality may be set to (40, 100]. That is, when the quality score output by the fingerprint quality evaluation model is within [0, 20), it may be determined that the quality evaluation result of the fingerprint image included in the input fused data is the low quality. When the quality score output by the fingerprint quality evaluation model is within (20, 40), it may be determined that the quality evaluation result of the fingerprint image included in the input fused data is the medium quality. When the quality score output by the fingerprint quality evaluation model is within (40, 100], it may be determined that the quality evaluation result of the fingerprint image included in the input fused data is the high quality. Certainly, when the quality score output by the fingerprint quality evaluation model is 20, the quality evaluation result of the fingerprint image included in the input fused data may be determined as the low quality or may be determined as the medium quality. This may be set based on an actual requirement, and is not limited herein. When the quality score output by the fingerprint quality evaluation model is 40, the quality evaluation result of the fingerprint image included in the input fused data may be determined as the medium quality or may be determined as the high quality. This may be set based on the actual requirement, and is not limited herein. In this way, the quality evaluation is performed on the fingerprint image based on the fused data. The fused data can better represent a feature of the fingerprint image. Therefore, accuracy of the quality evaluation on the fingerprint image can be improved.

For another example, the fused fingerprint data may alternatively be data obtained by fusing the raw image (namely, the raw image, for example, the first raw image) of the fingerprint collected by the fingerprint recognition module, the preprocessed image (namely, the fingerprint image, for example, the first fingerprint image) obtained by preprocessing the raw image, and the calibration data (namely, the base data) preset by the fingerprint recognition module. For example, after the calibration data is removed from the raw image (that is, a calibration data value of a corresponding pixel is subtracted from the pixel value of each pixel of the raw image), normalization processing may be performed (because data calculation is performed, normalization may be performed to flatten all values to a same interval to eliminate impact of an exception value) to obtain processed data. Then, multimodal data fusion is performed on the processed data and the preprocessed image to obtain the fused fingerprint data. In this way, denoising processing can be performed on the fused fingerprint data, thereby improving a training effect on the fingerprint quality evaluation model, and making quality evaluation of the fingerprint quality evaluation model more accurate. The quality score corresponding to the fused fingerprint data may be a quality score of a preprocessed image in the fused fingerprint data. Normalization processing performed on an intermediate graph obtained after the calibration data is removed from the raw image may be maximum-minimum normalization. That is, a pixel value of each pixel in the processed data obtained after normalization processing meets the following formula:

$$I = \frac{i - \min}{\max - \min}$$

I is a normalized pixel value, i is a pixel value of a corresponding pixel before normalization, min is a minimum pixel value of each pixel before normalization, and max is a maximum pixel value of each pixel before normalization.

Data obtained by fusing the raw image, the preprocessed image, and the calibration data may be used as the model input, and the quality score corresponding to the preprocessed image may be used as the model output to train the fingerprint quality evaluation model.

Figure 7:
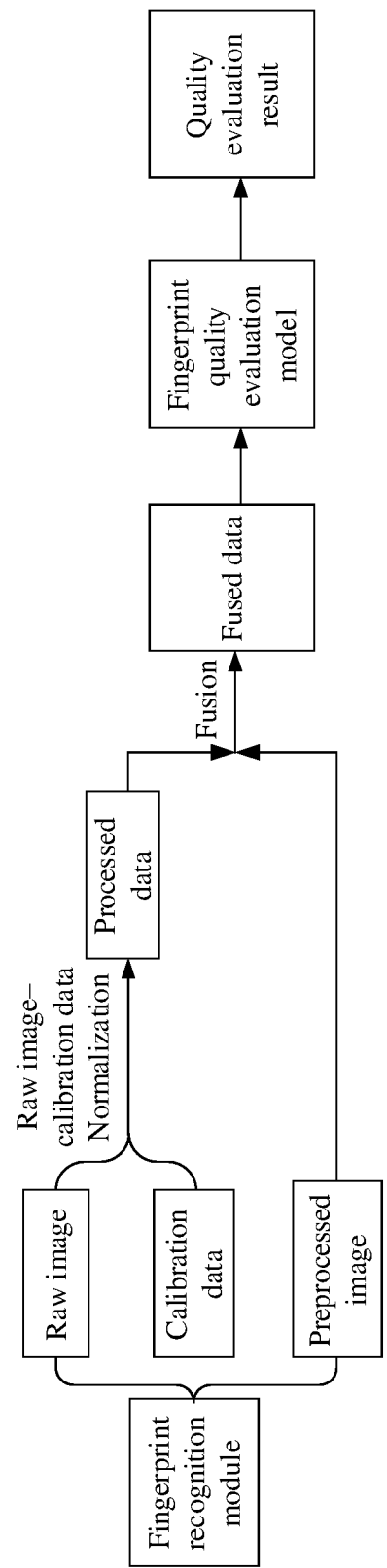
FIG. 7 is a schematic flowchart of another fingerprint quality evaluation according to an embodiment of this application.

As shown in FIG. 7, when the fingerprint quality evaluation model trained based on the foregoing example is used, that the mobile phone performs a quality evaluation on the fingerprint image may be: When the fingerprint recognition module collects the raw image of the fingerprint and obtains the preprocessed image (namely, the fingerprint image) based on the raw image, after removing the calibration data from the raw image (for example, a calibration data value of a corresponding pixel is subtracted from a pixel value of each pixel of the raw image), the mobile phone may perform normalization processing to obtain processed data, and then fuse the processed data with the preprocessed image to obtain fused data (that is, fused fingerprint data). Then, the mobile phone may input the fused data into the fingerprint quality evaluation model, so that the fingerprint quality evaluation model outputs a corresponding quality evaluation result (namely, the quality score). Quality levels of different fingerprint images may correspond to different quality score intervals. For example, quality scores may be set to 0-100, an interval corresponding to the quality level of the low quality may be set to [0, 20), an interval corresponding to the quality level of the medium quality may be set to (20, 40), and an interval corresponding to the quality level of the high quality may be set to (40, 100]. That is, when the quality score output by the fingerprint quality evaluation model is within [0, 20), it may be determined that the quality evaluation result of the fingerprint image included in the input fused data is the low quality. When the quality score output by the fingerprint quality evaluation model is within (20, 40), it may be determined that the quality evaluation result of the fingerprint image included in the input fused data is the medium quality. When the quality score output by the fingerprint quality evaluation model is within (40, 100], it may be determined that the quality evaluation result of the fingerprint image included in the input fused data is the high quality. Certainly, when the quality score output by the fingerprint quality evaluation model is 20, the quality evaluation result of the fingerprint image included in the input fused data may be determined as the low quality or may be determined as the medium quality. This may be set based on an actual requirement, and is not limited herein. When the quality score output by the fingerprint quality evaluation model is 40, the quality evaluation result of the fingerprint image included in the input fused data may be determined as the medium quality or may be determined as the high quality. This may be set based on the actual requirement, and is not limited herein.

It should be noted that, in this embodiment of this application, only the fingerprint image is used as the model input, and a quality score corresponding to the fingerprint image is used as the model output to train the model, so that the quality of the fingerprint image is directly determined based on the fingerprint image. For example, that the mobile phone performs a quality evaluation on the fingerprint image may be: When the fingerprint recognition module collects the raw image (for example, the first raw image) of the fingerprint and obtains the preprocessed image (namely, the fingerprint image, for example, the first fingerprint image) based on the raw image, the mobile phone may input the preprocessed image into the fingerprint quality evaluation model, so that the fingerprint quality evaluation model outputs a corresponding quality evaluation result (namely, the quality score), and may determine a corresponding quality level based on a quality score interval.

Alternatively, the raw image collected by the fingerprint recognition module may be used as the model input, and a quality score corresponding to the raw image is used as the model output to train the model, to directly determine quality of a corresponding fingerprint image based on the raw image. For example, that the mobile phone performs a quality evaluation on the fingerprint image may be: When the fingerprint recognition model collects the raw image of the fingerprint, the mobile phone may input the raw image into the fingerprint quality evaluation model, so that the fingerprint quality evaluation model outputs a corresponding quality evaluation result (namely, the quality score), and may determine a corresponding quality level based on a quality score interval.

S503: The mobile phone performs repair of a corresponding degree on the fingerprint image based on the quality evaluation result of the fingerprint image.

Based on the quality evaluation result of the fingerprint image, the mobile phone may perform lower-degree repair on a fingerprint image with higher quality (for example, the quality level), to avoid excessive repair of a high-quality fingerprint image.

For example, based on the quality evaluation result obtained in S502, the mobile phone may perform repair of a corresponding degree on the fingerprint image based on a quality level of the fingerprint image. That is, the mobile phone may repair the fingerprint image by using a corresponding repair degree based on a preset mapping relationship between a quality level and a repair degree (or a repair parameter or a repair model).

For example, when determining that the quality level of the fingerprint image is the low quality, the mobile phone may perform high-degree repair on the fingerprint image; or when determining that the quality level of the fingerprint image is the medium quality, the mobile phone may perform medium-degree repair on the fingerprint image; or when determining that the quality level of the fingerprint image is the high quality, the mobile phone may perform low-degree repair on the fingerprint image. That is, when quality of the fingerprint image is higher, lower-degree repair is performed on the fingerprint image, thereby avoiding distortion of the fingerprint image due to excessive repair of the fingerprint image.

As an example, the mobile phone may repair the fingerprint image by using a fingerprint repair model. The fingerprint repair model may be trained based on a Unet network structure (for example, a two-level Unet network structure). That is, the fingerprint repair model may be used to output a repaired image of a fingerprint image after the fingerprint image is input.

For example, the fingerprint repair model may use a same model structure, but use fingerprint repair parameters for fingerprint images of different quality levels, to perform fingerprint repair of different degrees on the fingerprint images of different quality levels. During training of the model, the fingerprint repair parameters for the fingerprint images of different quality levels may be obtained through training by using fingerprint images of different degradation degrees as training data.

For example, a degradation model may be used to perform low-degree degradation on a fingerprint image with a high recognition rate (for example, a fingerprint image whose fingerprint texture is clear and includes no discontinuity point), to obtain a training image whose quality is close to that of the high-quality fingerprint image (namely, the fingerprint image shown in FIG. 3C). The training image may be used as the model input, and a corresponding pre-degradation image (namely, the fingerprint image with a high recognition rate that exists before degradation and that corresponds to the training image) may be used as the model output to train the fingerprint repair model, so that a fingerprint repair parameter for a high-quality fingerprint image (for example, a high-quality fingerprint repair parameter, where the parameter can be used to perform low-degree repair on the fingerprint image) can be obtained.

For another example, the degradation model may be used to perform medium-degree degradation on the fingerprint image with a high recognition rate (for example, the fingerprint image whose fingerprint texture is clear and includes no discontinuity point), to obtain a training image whose quality is close to that of the medium-quality fingerprint image (namely, the fingerprint image shown in FIG. 3B). The training image may be used as the model input, and a corresponding pre-degradation image (namely, the fingerprint image with a high recognition rate that exists before degradation and that corresponds to the training image) may be used as the model output to train the fingerprint repair model, Therefore, a fingerprint repair parameter for a medium-quality fingerprint image (for example, a medium-quality fingerprint repair parameter, where the parameter can be used to perform medium-degree repair on the fingerprint image) can be obtained.

For another example, the degradation model may be used to perform high-degree degradation on a fingerprint image with a low recognition rate (for example, a fingerprint image whose fingerprint texture is blurry), to obtain a training image whose quality is close to that of the low-quality fingerprint image (namely, the fingerprint image shown in FIG. 3A). The training image may be used as the model input, and a corresponding pre-degradation image (namely, the fingerprint image with a low recognition rate that exists before degradation and that corresponds to the training image) is used as the model output to train the fingerprint repair model. Therefore, a fingerprint repair parameter for a low-quality fingerprint image (for example, a low-quality fingerprint repair parameter, where the parameter can be used to perform high-degree repair on the fingerprint image) can be obtained.

Figure 8:
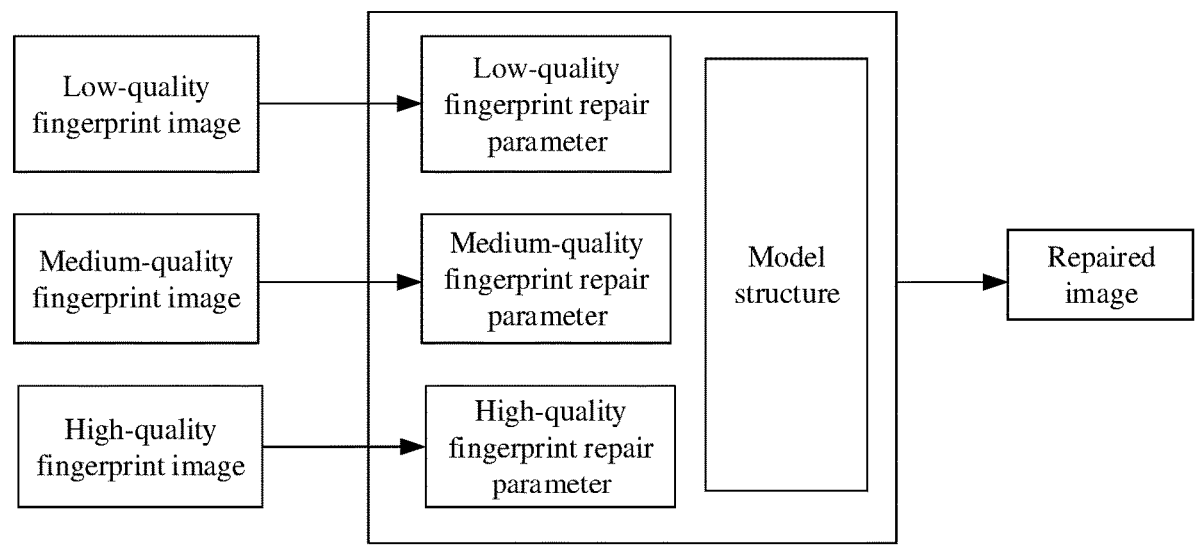
FIG. 8 is a schematic flowchart of fingerprint repair according to an embodiment of this application.

As shown in FIG. 8, the fingerprint repair model trained based on the foregoing example has the same model structure, and has different repair parameters for the fingerprint images of different quality levels (for example, the low-quality fingerprint repair parameter for a low-quality fingerprint image, the medium-quality fingerprint repair parameter for a medium-quality fingerprint image, and the high-quality fingerprint repair parameter for a high-quality fingerprint image). When the fingerprint repair model is used, that mobile phone performs repair of a corresponding degree on the fingerprint image based on the quality evaluation result of the fingerprint image may be: repairing the fingerprint image by using a corresponding repair parameter based on a preset mapping relationship between a quality level and a repair parameter. For example, when determining that a fingerprint image (for example, a fifth fingerprint image) is a low-quality fingerprint image, the mobile phone inputs the low-quality fingerprint image into the fingerprint repair model to repair the fingerprint image by using the low-quality fingerprint repair parameter, so as to obtain a high-level repaired image (for example, a sixth fingerprint image). When determining that a fingerprint image (for example, the third fingerprint image) is a medium-quality fingerprint image, the mobile phone inputs the medium-quality fingerprint image into the fingerprint repair model to repair the fingerprint image by using the medium-quality fingerprint repair parameter, so as to obtain a medium-level repaired image (for example, a fourth fingerprint image). When determining that a fingerprint image (for example, the first fingerprint image) is a high-quality fingerprint image, the mobile phone inputs the high-quality fingerprint image into the fingerprint repair model to repair the fingerprint image by using the high-quality fingerprint repair parameter, so as to obtain a low-level repaired image (for example, a second fingerprint image).

Optionally, in this embodiment of this application, fingerprint repair models (for example, a first repair model, a second repair model, and a third repair model in this application) that are for the fingerprint images of different quality levels and that are independent (that is, have independent model structures) of each other may be separately trained based on the foregoing fingerprint repair model training method. This is not limited herein. Correspondingly, when the fingerprint repair model is used, that mobile phone performs repair of a corresponding degree on the fingerprint image based on the quality evaluation result of the fingerprint image may be: repairing the fingerprint image by using a corresponding repair model based on a preset mapping relationship between a quality level and a repair model. For example, when determining that a fingerprint image (for example, a fifth fingerprint image) is a low-quality fingerprint image, the mobile phone inputs the fingerprint image into a fingerprint repair model for a low-quality fingerprint image (for example, the third repair model) to repair the fingerprint image, to obtain a high-level repaired image (for example, a sixth fingerprint image). When determining that a fingerprint image (for example, the third fingerprint image) is a medium-quality fingerprint image, the mobile phone inputs the fingerprint image into a fingerprint repair model for a medium-quality fingerprint image (for example, the second repair model) to repair the fingerprint image, to obtain a medium-level repaired image (for example, a fourth fingerprint image). When determining that a fingerprint image (for example, the first fingerprint image) is a high-quality fingerprint image, the mobile phone inputs the fingerprint image into a fingerprint repair model for a high-quality fingerprint image (for example, the first repair model) to repair the fingerprint image, to obtain a low-level repaired image (for example, a second fingerprint image).

S504: The mobile phone performs fingerprint recognition based on the repaired fingerprint image.

Optionally, a fingerprint recognition algorithm in a fingerprint recognition-related technology may be used by the mobile phone to perform fingerprint recognition based on the repaired fingerprint image. This is not limited herein. For example, the repaired fingerprint image is compared with a stored fingerprint image input by a user, and when a similarity (for example, a structural similarity (structural similarity, SSIM) value) between the two is greater than a threshold, recognition succeeds.

Figure 9:
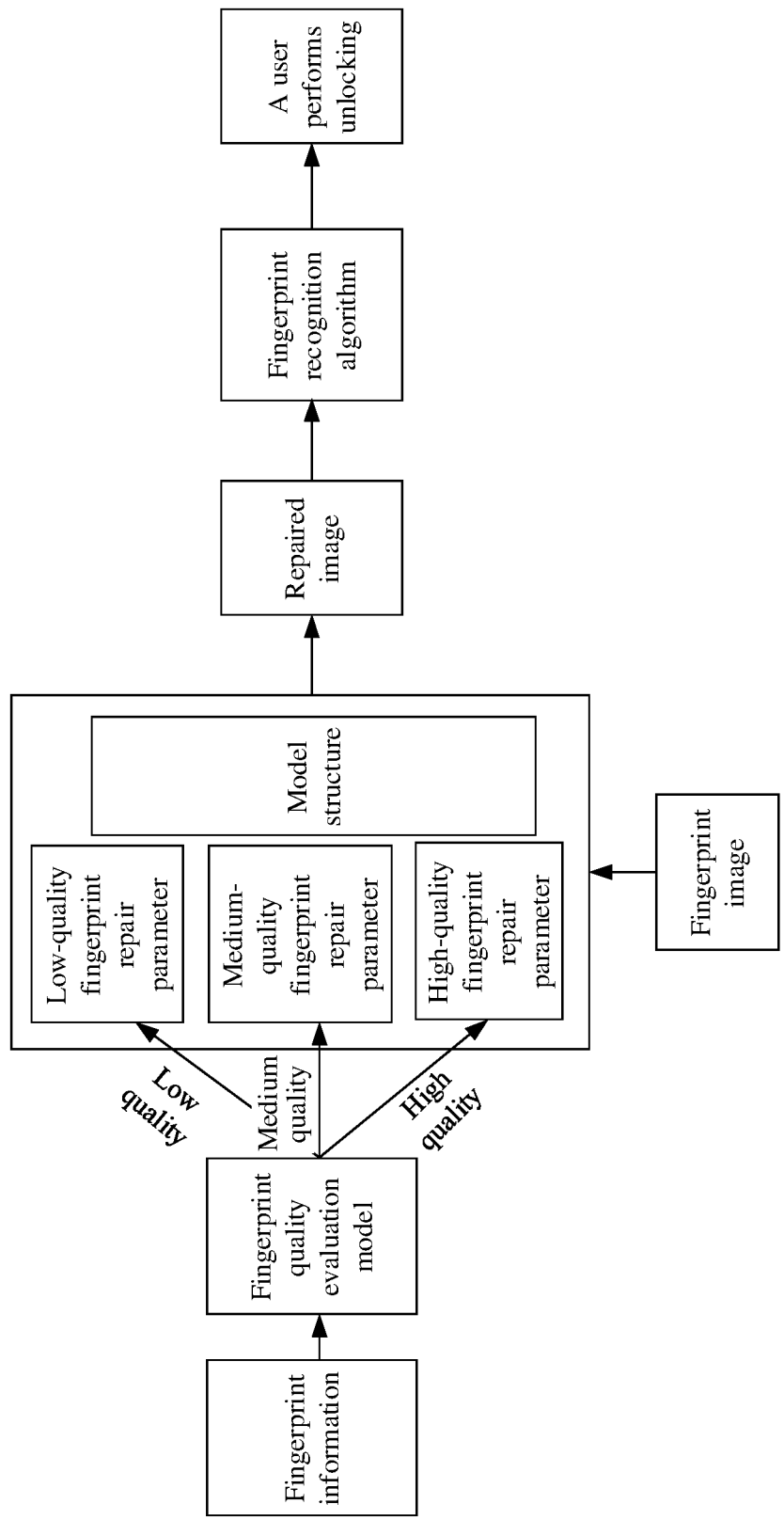
FIG. 9 is a schematic flowchart of another fingerprint recognition method according to an embodiment of this application.

Based on the fingerprint recognition method shown in FIG. 5, as shown in FIG. 9, in this embodiment of this application, after the mobile phone collects fingerprint information of the user (for example, the fingerprint information includes the fingerprint image, the raw image of the fingerprint, and the calibration data) by using the fingerprint recognition module, a fingerprint recognition process performed by the mobile phone may be: inputting the fingerprint information into the fingerprint quality evaluation model, to enable the fingerprint quality evaluation model to output a corresponding quality evaluation result (for example, the evaluation result is that the quality level is the low quality, the medium quality, or the high quality). When the quality evaluation result output by the fingerprint quality evaluation model is the low quality, the mobile phone may input the fingerprint image into the fingerprint repair model to repair the fingerprint image by using the low-quality fingerprint repair parameter, so as to obtain the high-level repaired image. Then, fingerprint recognition is performed on the repaired image based on the fingerprint recognition algorithm, and the user performs unlocking when recognition succeeds. When the quality evaluation result output by the fingerprint quality evaluation model is the medium quality, the mobile phone may input the fingerprint image into the fingerprint repair model to repair the fingerprint image by using the medium-quality fingerprint repair parameter, so as to obtain the medium-level repaired image. Then, fingerprint recognition is performed on the repaired image based on the fingerprint recognition algorithm, and the user performs unlocking when recognition succeeds. When the quality evaluation result output by the fingerprint quality evaluation model is the high quality, the mobile phone may input the fingerprint image into the fingerprint repair model to repair the fingerprint image by using the high-quality fingerprint repair parameter, so as to obtain the low-level repaired image. Then, fingerprint recognition is performed on the repaired image based on the fingerprint recognition algorithm, and the user performs unlocking when recognition succeeds.

Figure 10:
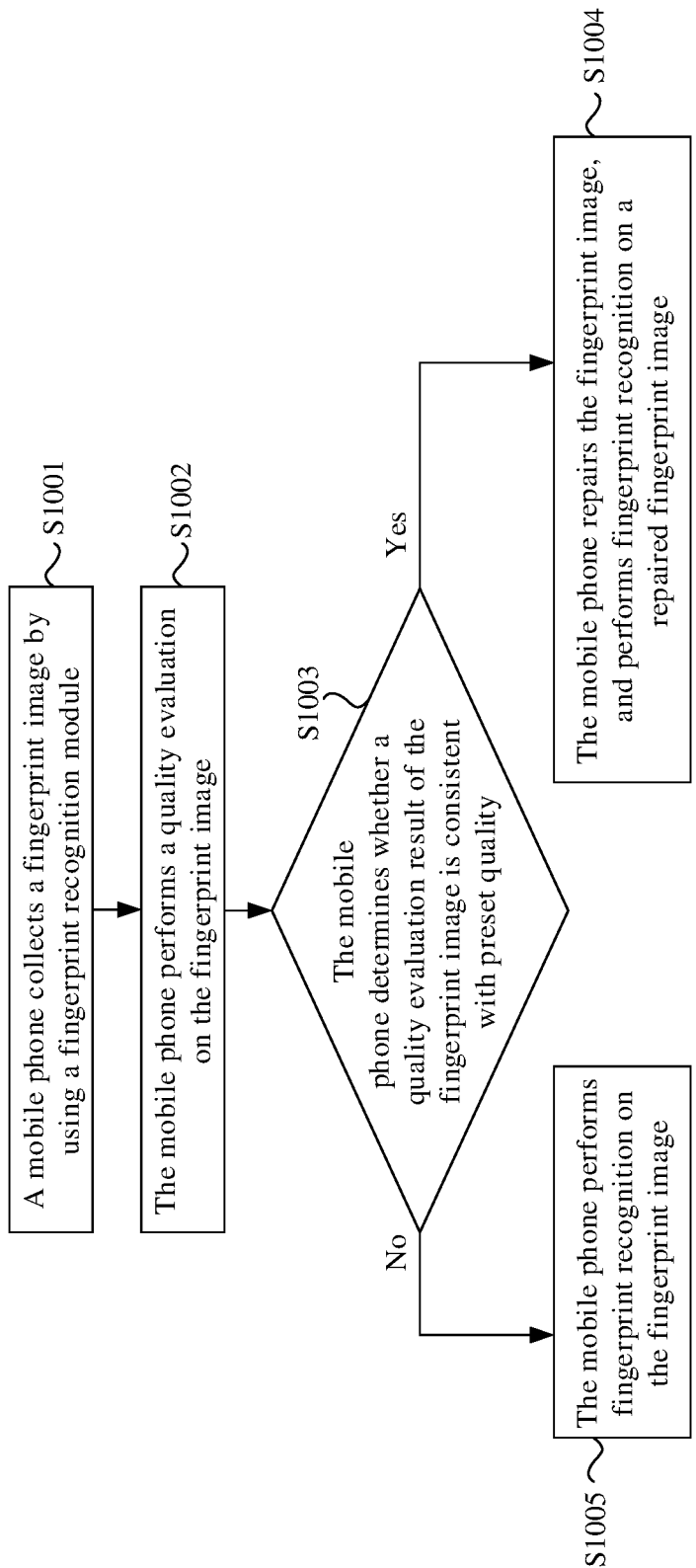
FIG. 10 is a schematic flowchart of another fingerprint recognition method according to an embodiment of this application.

Optionally, in this embodiment of this application, the mobile phone may further repair only a fingerprint image of a repairable quality level (or only a fingerprint image whose quality level corresponding to a quality evaluation result is the preset quality level). That the electronic device is the mobile phone, and fingerprint images obtained by a fingerprint recognition module (or referred to as the fingerprint sensor) of the electronic device may be classified into three quality levels of low quality shown in FIG. 3A, medium quality shown in FIG. 3B, and high quality shown in FIG. 3C is still used as an example. FIG. 10 shows another fingerprint recognition method according to an embodiment of this application. As shown in FIG. 10, the method may include S1001 to S1005.

S1001: The mobile phone obtains a fingerprint image by using the fingerprint recognition module.

S1002: The mobile phone performs a quality evaluation on the fingerprint image.

S1003: The mobile phone determines whether a quality evaluation result of the fingerprint image is consistent with preset quality. If yes, S1004 is performed; or if no, S1005 is performed.

For example, the preset quality may be a preset quality level of a repairable fingerprint image. For example, the preset quality level is the medium quality, and when a quality level determined after the mobile phone performs the quality evaluation on the fingerprint image is the medium quality, the mobile phone may determine that the quality evaluation result is consistent with the preset quality. For example, after collecting a raw image (for example, a first raw image) of a fingerprint of a user by using a fingerprint recognition model, the mobile phone may preprocess the raw image based on preset calibration data to obtain a preprocessed image (namely, the fingerprint image, for example, a first fingerprint image). Then, the mobile phone may perform a quality evaluation on the preprocessed image. If it is determined that a quality level of the preprocessed image is the medium quality, it may be determined that a quality evaluation result of the preprocessed image is consistent with the preset quality level, that is, the quality level of the preprocessed image is the preset quality level. If it is determined that the quality level of the preprocessed image is not the medium quality (for example, is the high quality or the low quality), it may be determined that the quality evaluation result of the preprocessed image is inconsistent with the preset quality level, that is, the quality level of the preprocessed image is not the preset quality level.

S1004: The mobile phone repairs the fingerprint image, and performs fingerprint recognition on a repaired fingerprint image.

The mobile phone may repair the fingerprint image whose quality evaluation result is consistent with the preset quality by using a fingerprint repair model. The fingerprint repair model may be used to perform repair of a corresponding degree on the fingerprint image corresponding to the preset quality. In this case, for the fingerprint repair model, reference may be made to an implementation of the fingerprint repair model in S503 shown in FIG. 5. A difference lies in that only fingerprint repair parameters corresponding to the preset quality are used to train the fingerprint repair model.

S1005: The mobile phone performs fingerprint recognition on the fingerprint image.

It should be noted that specific implementations of S1001 and S1002 are respectively the same as those of S501 and S502 shown in FIG. 5. Details are not described herein. Specific implementations of fingerprint recognition in S1004 and S1005 are the same as or similar to a fingerprint recognition manner in S504 shown in FIG. 5. Details are not described herein.

It should be further noted that, according to the method shown in FIG. 10, there may be two preset quality levels, for example, the preset quality levels are the medium quality and the high quality. When the quality level determined after the mobile phone performs the quality evaluation on the fingerprint image is the medium quality, the mobile phone may determine that the quality evaluation result is consistent with the preset quality, and repair the fingerprint image by using a medium-quality fingerprint repair parameter in the fingerprint repair model to obtain the repaired image. When the quality level determined after the mobile phone performs the quality evaluation on the fingerprint image is the high quality, the mobile phone may determine that the quality evaluation result is consistent with the preset quality, and repair the fingerprint image by using a high-quality fingerprint repair parameter in the fingerprint repair model to obtain the repaired image. When the quality level determined after the mobile phone performs the quality evaluation on the fingerprint image is the low quality, the mobile phone may determine that the quality evaluation result is inconsistent with the preset quality, and directly perform fingerprint recognition without repairing the fingerprint image.

Figure 11:
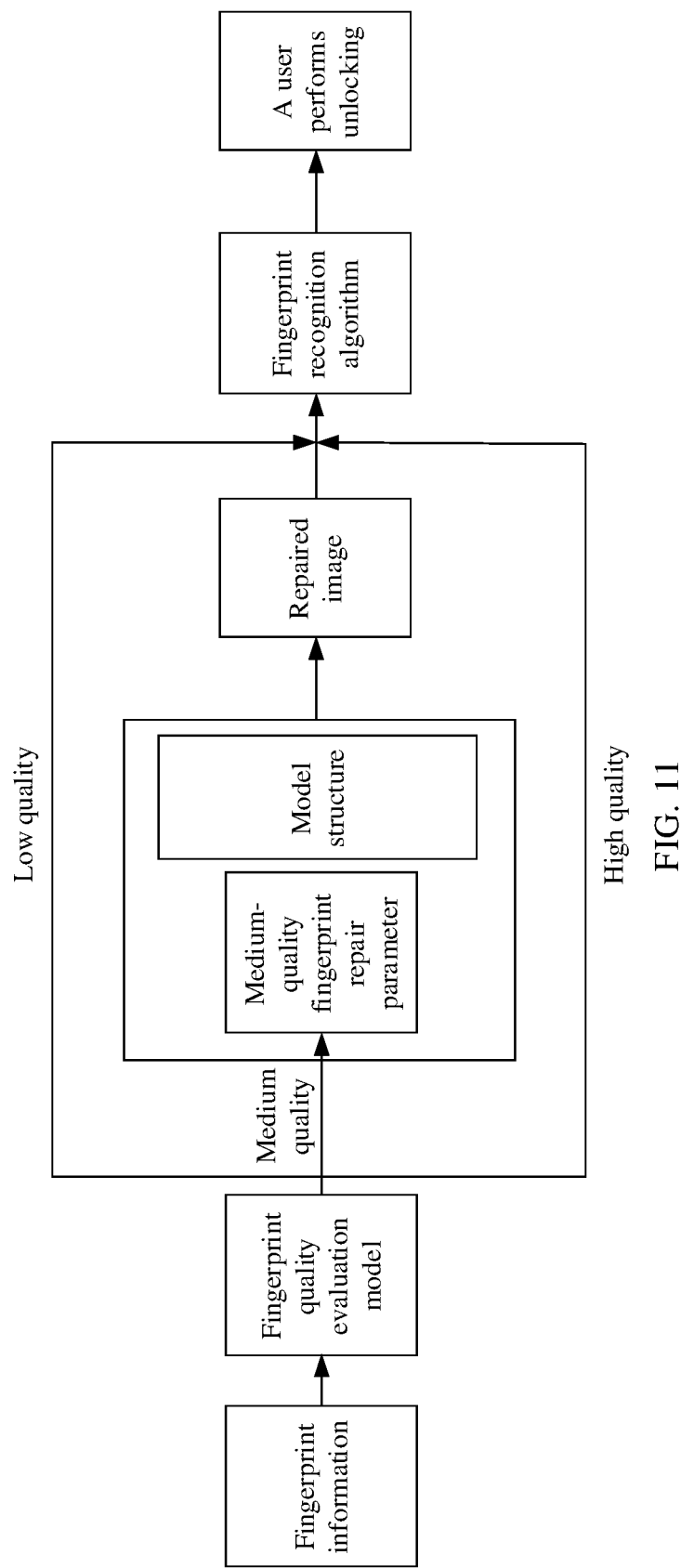
FIG. 11 is a schematic flowchart of another fingerprint recognition method according to an embodiment of this application.

According to the fingerprint recognition method shown in FIG. 10, as shown in FIG. 11, for example, the preset quality level is the medium quality, in this embodiment of this application, after the mobile phone obtains fingerprint information of the user (for example, the fingerprint information includes the fingerprint image, the raw image of the fingerprint, and the calibration data) by using the fingerprint recognition module, a fingerprint recognition process performed by the mobile phone may be: inputting the fingerprint information into a fingerprint quality evaluation model, to enable the fingerprint quality evaluation model to output a corresponding quality evaluation result (for example, the evaluation result is that the quality level is the low quality, the medium quality, or the high quality). When the quality evaluation result output by the fingerprint quality evaluation model is the low quality, the mobile phone may directly perform fingerprint recognition on the fingerprint image based on a fingerprint recognition algorithm. The user performs unlocking when recognition succeeds. When the quality evaluation result output by the fingerprint quality evaluation model is the medium quality, the mobile phone may input the fingerprint image into the fingerprint repair model to repair the fingerprint image by using the medium-quality fingerprint repair parameter, so as to obtain the medium-level repaired image. Then, fingerprint recognition is performed on the repaired image based on the fingerprint recognition algorithm, and the user performs unlocking when recognition succeeds. When the quality evaluation result output by the fingerprint quality evaluation model is the high quality, the mobile phone may directly perform fingerprint recognition on the fingerprint image based on the fingerprint recognition algorithm, and the user performs unlocking when recognition succeeds.

Optionally, based on the method shown in FIG. 5 and FIG. 10, in this embodiment of this application, a fingerprint repair switch may be further set in a setting list of the mobile phone, so that the user can choose whether to enable fingerprint repair during fingerprint recognition.

According to the fingerprint recognition method, repair of a corresponding degree can be performed based on the quality of the fingerprint image obtained by the fingerprint recognition module, and then fingerprint recognition is performed. Therefore, a fingerprint recognition rate can be increased by improving the quality of the fingerprint image through repairing the fingerprint image, and recognizing a fake fingerprint due to excessive repair of the fingerprint image can be avoided during fingerprint recognition.

Corresponding to the methods in the foregoing embodiments, an embodiment of this application further provides a fingerprint recognition apparatus. The apparatus may be applied to the foregoing electronic device to implement the methods in the foregoing embodiments. A function of the apparatus may be implemented by hardware or may be implemented by corresponding software executed by hardware. The hardware or software includes one or more modules corresponding to the foregoing functions. For example, the apparatus includes a processing module, a fingerprint recognition module, and the like. The processing module and the fingerprint recognition module may cooperate with each other to implement related methods in the foregoing embodiments.

It should be understood that division of units or modules (referred to as the units in the following) in the apparatus is merely logical function division. In an actual implementation, all or some of the units or modules may be integrated into one physical entity, or may be physically separated. In addition, all the units in the apparatus may be implemented by software invoked by a processing element, or may be implemented by hardware; or some units may be implemented by software invoked by a processing element, and some units are implemented by hardware.

For example, the units may be separately disposed processing elements, or may be integrated into a chip for implementation, or may be stored in a memory in a form of a program and invoked by a processing element to implement functions of the foregoing units. In addition, all or some of these units may be integrated together, or may be implemented independently. The processing element described herein may also be referred to as a processor, and may be an integrated circuit that has a signal processing capability. In an implementation process, the steps in the foregoing method or the foregoing units may be implemented by using a hardware integrated logical circuit in the processing element, or by using instructions in a form of software.

For example, the unit in the apparatus may be one or more integrated circuits configured to implement the foregoing method, such as one or more ASICs, one or more DSPs, one or more FPGAs, or a combination of at least two of these integrated circuit forms.

For another example, when the unit in the apparatus may be implemented by scheduling a program by using the processing element, the processing element may be a general-purpose processor, for example, a CPU or another processor that can invoke the program. For another example, these units may be integrated together and implemented in a form of a system on chip (system-on-a-chip, SOC).

In an implementation, the apparatus may implement units corresponding to the steps in the foregoing method by scheduling a program by using the processing element. For example, the apparatus may include a processing element and a storage element, and the processing element invokes a program stored in the storage element to perform the methods described in the foregoing method embodiments. The storage element may be a storage element that is on a same chip as the processing element, that is, an on-chip storage element.

In another implementation, a program used to perform the foregoing method may be on the storage element that is on a different chip from the processing element, that is, an off-chip storage element. In this case, the processing element invokes the program from the off-chip storage element or loads the program to the on-chip storage element, to invoke and perform the methods described in the method embodiments.

For example, an embodiment of this application may further provide an apparatus, for example, an electronic device, which may include a processor and a memory for storing instructions executable by the processor. When the processor is configured to execute the instructions, the electronic device is enabled to implement the fingerprint recognition methods implemented by the electronic device in the foregoing embodiments. The memory may be located in the electronic device, or may be located outside the electronic device. In addition, a quantity of the processors is one or more.

In still another implementation, the unit for implementing the steps in the foregoing method in the apparatus may be configured as one or more processing elements, and these processing elements may be disposed on the corresponding electronic device described above. The processing element herein may be an integrated circuit, for example, one or more ASICs, one or more DSPs, one or more FPGAs, or a combination of these types of integrated circuits. These integrated circuits may be integrated together to form a chip.

For example, an embodiment of this application further provides a chip system, and the chip system may be applied to the foregoing electronic device. The chip system includes one or more interface circuits and one or more processors. The interface circuit and the processor are connected to each other through a line. The processor receives and executes computer instructions from the memory of the electronic device by using the interface circuit, to implement the method related to the electronic device in the foregoing method embodiments.

An embodiment of this application further provides a computer program product, including computer instructions that are run by an electronic device, for example, the foregoing electronic device.

According to the foregoing description of the implementations, a person skilled in the art may clearly understand that, for convenience and brevity of the description, division of the foregoing function modules is only used as an example for illustration. In actual application, the foregoing functions can be allocated to different function modules and implemented according to needs, that is, an inner structure of an apparatus is divided into different function modules to implement all or some of the foregoing functions described above.

In several embodiments provided in this application, it should be understood that the disclosed apparatus and method may be implemented in another manner. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one physical unit or a plurality of physical units, that is, may be located in one place, or may be distributed in a plurality of different places. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product, for example, a program. The software product is stored in a program product, such as a computer-readable storage medium, and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

For example, an embodiment of this application may further provide a computer-readable storage medium, and the computer-readable storage medium stores computer program instructions. When the computer program instructions are executed by an electronic device, the electronic device is enabled to implement the fingerprint recognition methods described in the foregoing method embodiments.

The foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A fingerprint recognition method, comprising:
obtaining a first fingerprint image of a user;
performing a quality evaluation on the first fingerprint image;
determining the first fingerprint image to be a first quality level, wherein the first quality level identifies a quality of the first fingerprint image;
determining a first repair model based on the first quality level, wherein the first repair model comprises a first repair parameter, and the first repair model corresponds to the first quality level;
processing the first fingerprint image based on the first repair model to obtain a second fingerprint image;
performing fingerprint recognition by using the second fingerprint image;
obtaining a third fingerprint image of the user;
performing a quality evaluation on the third fingerprint image;
determining the third fingerprint image to be a second quality level, wherein the second quality level identifies a quality of the third fingerprint image;
determining a second repair model based on the second quality level, wherein the first repair model is the same repair model or a different repair model from the second repair model, the second repair model comprises a second repair parameter, and the second repair model corresponds to the second quality level;
processing the third fingerprint image based on the second repair model to obtain a fourth fingerprint image; and
performing fingerprint recognition by using the fourth fingerprint image; and
wherein the first quality level is higher than the second quality level, and a change degree between the second fingerprint image and the first fingerprint image is less than a change degree between the fourth fingerprint image and the third fingerprint image.

2. The method according to claim 1, wherein determining the first repair model based on the first quality level comprises:
determining the first repair parameter based on the first quality level and a preset mapping relationship between at least one quality level and at least one repair parameter; and
determining a repair model that comprises the first repair parameter as the first repair model; and
wherein determining the second repair model based on the second quality level comprises:
determining the second repair parameter based on the second quality level and the preset mapping relationship between the at least one quality level and the at least one repair parameter; and
determining a repair model that comprises the second repair parameter as the second repair model.

3. The method according to claim 1, wherein the first repair model is a different repair model than the second repair model;
wherein determining the first repair model based on the first quality level comprises:
determining the first repair model based on the first quality level and a preset mapping relationship between a plurality of quality levels and a plurality of repair models; and
wherein determining the second repair model based on the second quality level comprises:
determining the second repair model based on the second quality level and the preset mapping relationship between the plurality of quality levels and the plurality of repair models.

4. The method according to claim 1, wherein obtaining the first fingerprint image of the user comprises:
collecting a first raw image of a fingerprint of the user; and
preprocessing the first raw image based on preset calibration data to obtain the first fingerprint image, wherein the preset calibration data comprises noise data obtained when the first raw image is collected.

5. The method according to claim 4, wherein performing the quality evaluation on the first fingerprint image comprises:
fusing the first fingerprint image with the first raw image; and
performing the quality evaluation on the first fingerprint image based on a fusion result of the first fingerprint image and the first raw image.

6. The method according to claim 5, wherein before fusing the first fingerprint image with the first raw image, the method further comprises:
processing the first raw image based on the preset calibration data; and
wherein fusing the first fingerprint image with the first raw image comprises:
fusing a result obtained by processing the first raw image based on the preset calibration data with the first fingerprint image.

7. The method according to claim 1, wherein the first repair model is the same repair model as the second repair model.

8. An electronic device, comprising:
at least one processor; and
a non-transitory memory storing executable instructions of the at least one processor, wherein when the at least one processor executes the instructions, the electronic device is enabled to perform the following:
obtaining a first fingerprint image of a user;
performing a quality evaluation on the first fingerprint image;
determining the first fingerprint image to be a first quality level, wherein the first quality level identifies a quality of the first fingerprint image;
determining a first repair model based on the first quality level, wherein the first repair model comprises a first repair parameter, and the first repair model corresponds to the first quality level;
processing the first fingerprint image based on the first repair model to obtain a second fingerprint image;
performing fingerprint recognition by using the second fingerprint image;
obtaining a third fingerprint image of the user;
performing a quality evaluation on the third fingerprint image;
determining the third fingerprint image to be a second quality level, wherein the second quality level identifies a quality of the third fingerprint image;
determining a second repair model based on the second quality level, wherein the first repair model is the same repair model or a different repair model from the second repair model, the second repair model comprises a second repair parameter, and the second repair model corresponds to the second quality level;
processing the third fingerprint image based on the second repair model to obtain a fourth fingerprint image; and
performing fingerprint recognition by using the fourth fingerprint image; and
wherein the first quality level is higher than the second quality level, and a change degree between the second fingerprint image and the first fingerprint image is less than a change degree between the fourth fingerprint image and the third fingerprint image.

9. The electronic device according to claim 8, wherein determining the first repair model based on the first quality level comprises:
determining the first repair parameter based on the first quality level and a preset mapping relationship between at least one quality level and at least one repair parameter; and
determining a repair model that comprises the first repair parameter as the first repair model; and
wherein determining the second repair model based on the second quality level comprises:
determining the second repair parameter based on the second quality level and the preset mapping relationship between the at least one quality level and the at least one repair parameter; and
determining a repair model that comprises the second repair parameter as the second repair model.

10. The electronic device according to claim 8, wherein the first repair model is a different repair model than the second repair model;
wherein determining the first repair model based on the first quality level comprises:
determining the first repair model based on the first quality level and a preset mapping relationship between a plurality of quality levels and a plurality of repair models; and
wherein determining the second repair model based on the second quality level comprises:
determining the second repair model based on the second quality level and the preset mapping relationship between the plurality of quality levels and the plurality of repair models.

11. The electronic device according to claim 8, wherein obtaining the first fingerprint image of the user comprises:
collecting a first raw image of a fingerprint of the user; and
preprocessing the first raw image based on preset calibration data to obtain the first fingerprint image, wherein the preset calibration data comprises noise data obtained when the first raw image is collected.

12. The electronic device according to claim 11, wherein performing the quality evaluation on the first fingerprint image comprises:
fusing the first fingerprint image with the first raw image; and
performing the quality evaluation on the first fingerprint image based on a fusion result of the first fingerprint image and the first raw image.

13. The electronic device according to claim 12, wherein when the at least one processor executes the instructions, the electronic device is enabled to further perform the following:
before fusing the first fingerprint image with the first raw image, processing the first raw image based on the preset calibration data; and
wherein fusing the first fingerprint image with the first raw image comprises:
fusing a result obtained by processing the first raw image based on the preset calibration data with the first fingerprint image.

14. The electronic device according to claim 8, wherein the first repair model is the same repair model as the second repair model.

15. A non-transitory computer-readable storage medium, wherein the non-transitory computer-readable storage medium stores computer program instructions; and when the computer program instructions are executed by an electronic device, the electronic device is enabled to perform the following:
obtaining a first fingerprint image of a user;
performing a quality evaluation on the first fingerprint image;
determining the first fingerprint image to be a first quality level, wherein the first quality level identifies a quality of the first fingerprint image;
determining a first repair model based on the first quality level, wherein the first repair model comprises a first repair parameter, and the first repair model corresponds to the first quality level;
processing the first fingerprint image based on the first repair model to obtain a second fingerprint image;
performing fingerprint recognition by using the second fingerprint image;
obtaining a third fingerprint image of the user;
performing a quality evaluation on the third fingerprint image;
determining the third fingerprint image to be a second quality level, wherein the second quality level identifies a quality of the third fingerprint image;
determining a second repair model based on the second quality level, wherein the first repair model is the same repair model or a different repair model from the second repair model, the second repair model comprises a second repair parameter, and the second repair model corresponds to the second quality level;
processing the third fingerprint image based on the second repair model to obtain a fourth fingerprint image; and
performing fingerprint recognition by using the fourth fingerprint image; and
wherein the first quality level is higher than the second quality level, and a change degree between the second fingerprint image and the first fingerprint image is less than a change degree between the fourth fingerprint image and the third fingerprint image.

16. The non-transitory computer-readable storage medium according to claim 15, wherein determining the first repair model based on the first quality level comprises:
determining the first repair parameter based on the first quality level and a preset mapping relationship between at least one quality level and at least one repair parameter; and
determining a repair model that comprises the first repair parameter as the first repair model; and
wherein determining the second repair model based on the second quality level comprises:
determining the second repair parameter based on the second quality level and the preset mapping relationship between the at least one quality level and the at least one repair parameter; and
determining a repair model that comprises the second repair parameter as the second repair model.

17. The non-transitory computer-readable storage medium according to claim 15, wherein obtaining the first fingerprint image of the user comprises:
collecting a first raw image of a fingerprint of the user; and
preprocessing the first raw image based on preset calibration data to obtain the first fingerprint image, wherein the preset calibration data comprises noise data obtained when the first raw image is collected.

18. The non-transitory computer-readable storage medium according to claim 17, wherein performing the quality evaluation on the first fingerprint image comprises:
fusing the first fingerprint image with the first raw image; and
performing the quality evaluation on the first fingerprint image based on a fusion result of the first fingerprint image and the first raw image.

19. The non-transitory computer-readable storage medium according to claim 18, wherein when the computer program instructions are executed by the electronic device, the electronic device is further enabled to perform the following:
before fusing the first fingerprint image with the first raw image, processing the first raw image based on the preset calibration data; and
wherein fusing the first fingerprint image with the first raw image comprises:
fusing a result obtained by processing the first raw image based on the preset calibration data with the first fingerprint image.

20. The non-transitory computer-readable storage medium according to claim 15, wherein the first repair model is the same repair model as the second repair model.

* * * * *